United States Patent
McGregor et al.

(10) Patent No.: US 7,596,373 B2
(45) Date of Patent: Sep. 29, 2009

(54) METHOD AND SYSTEM FOR QUALITY OF SERVICE (QOS) MONITORING FOR WIRELESS DEVICES

(76) Inventors: Christopher M. McGregor, 1880 Steiner St., #405, San Francisco, CA (US) 94115; Gregory M. McGregor, 105 St. Nazire Ct., Martinez, CA (US) 94553

( * ) Notice: Subject to any disclaimer, the term of this patent is extended or adjusted under 35 U.S.C. 154(b) by 45 days.

(21) Appl. No.: 10/393,600

(22) Filed: Mar. 20, 2003

(65) Prior Publication Data

US 2004/0058652 A1 Mar. 25, 2004

Related U.S. Application Data

(60) Provisional application No. 60/366,787, filed on Mar. 21, 2002.

(51) Int. Cl.
*H04W 24/00* (2009.01)
(52) U.S. Cl. ............... 455/425; 455/423; 455/424; 455/418; 455/419; 455/420; 455/67.11; 455/67.14; 455/67.7
(58) Field of Classification Search ......... 455/423–425, 455/67.11–67.16, 67.7, 405, 418–420, 414.1, 455/3, 404.2, 456.1–456.2, 13, 11.1, 414.3, 455/13.1
See application file for complete search history.

(56) References Cited

U.S. PATENT DOCUMENTS

| | | | |
|---|---|---|---|
| 3,916,379 A | 10/1975 | Dulaney et al. | |
| 4,296,495 A | 10/1981 | Bursztejn | |
| 5,325,418 A | 6/1994 | McGregor et al. | |
| 5,425,076 A * | 6/1995 | Knippelmier | 379/27.04 |
| 5,577,100 A | 11/1996 | McGregor et al. | |
| 5,625,669 A | 4/1997 | McGregor et al. | |
| 5,640,684 A * | 6/1997 | Konosu et al. | 455/67.7 |
| 5,805,666 A * | 9/1998 | Ishizuka et al. | 379/1.01 |
| 5,883,819 A | 3/1999 | Abu-Amara et al. | |
| 6,088,588 A * | 7/2000 | Osborne | 455/425 |
| 6,112,236 A | 8/2000 | Dollin et al. | |
| 6,119,235 A | 9/2000 | Vaid et al. | |
| 6,138,004 A | 10/2000 | McGregor et al. | |
| 6,147,998 A | 11/2000 | Kelley et al. | |
| 6,198,910 B1 | 3/2001 | Hanley | |
| 6,198,915 B1 | 3/2001 | McGregor et al. | |
| 6,219,544 B1 * | 4/2001 | Suutarinen | 455/423 |
| 6,243,574 B1 | 6/2001 | McGregor et al. | |

(Continued)

*Primary Examiner*—Tuan A Tran
(74) *Attorney, Agent, or Firm*—Richard Esty Peterson

(57) ABSTRACT

Method and apparatus to monitor MQoS of wireless mobile devices is described. In one embodiment, the present invention provides a method to monitor the health of 3G mobile devices and provide a status check of such health to network technicians, supervisors, and management. In one aspect, mobile devices on the network perform measurement of MQoS factors that are reported to a quality of service backend. The MQoS data is combined to show current and historical network status. In another aspect, alarms may be set to notify specific managers when manager programmable conditions occur, such as low system performance, or specific error conditions occur. Reports may be generated summarizing and illustrating performance in tabular and graphical form. Parameters used for testing and monitoring mobile devices may be input to specific mobile devices or groups of mobile devices in a system. In one aspect, customer care or call centers may be enabled to request specific tests from specific mobile devices and utilize the overall network status to diagnose and/or resolve customer issues.

38 Claims, 12 Drawing Sheets

U.S. PATENT DOCUMENTS

| | | |
|---|---|---|
| 6,308,071 B1 * | 10/2001 | Kalev .................... 455/446 |
| 6,434,364 B1 * | 8/2002 | O'Riordain ............ 455/67.11 |
| 6,603,975 B1 | 8/2003 | Inouchi et al. |
| 6,754,470 B2 | 6/2004 | Hendrickson et al. |
| 6,798,745 B1 | 9/2004 | Feinberg |
| 7,043,237 B2 * | 5/2006 | Snyder et al. .............. 455/425 |
| 7,289,453 B2 | 10/2007 | Riedel et al. |
| 2001/0049263 A1 * | 12/2001 | Zhang ..................... 455/67.1 |
| 2003/0134631 A1 * | 7/2003 | Snyder et al. .............. 455/423 |
| 2004/0071084 A1 | 4/2004 | El-Hennaway et al. |

* cited by examiner

1000

METHOD AND SYSTEM FOR QUALITY OF SERVICE (QOS) MONITORING FOR WIRELESS DEVICES

CROSS-REFERENCE TO RELATED APPLICATIONS

The present invention is based on U.S. Provisional Patent Application Ser. No. 60/366,787, filed Mar. 21, 2002 entitled "Method And System For Quality of Service (QoS) Monitoring For 3G Handset Devices" filed in the name of Christopher M. McGregor, et al. The priority of this provisional application is hereby claimed and it is hereby incorporated herein by reference thereto.

BACKGROUND OF THE INVENTION

1. Field of the Invention

Embodiments of the present invention generally relates to Quality of Service (QoS) monitoring of packet-based wireless data transmissions. More specifically, the present invention relates to QoS of wireless mobile devices.

2. Description of the Related Art

Generally, a communication system includes a transmitter and receiver that transmit and receive information signals over a transmission media such as wires or atmosphere. When atmosphere is used, the transmission is commonly referred to as "wireless communication". Examples of various types of wireless communication systems include digital cellular, packet data paging, wireless local area networks (WLAN), wireless wide area networks (WWAN), personal communication systems, and others.

Wireless communication systems use analog and/or digital systems to transmit data. Wireless analog systems, such as AMPS, NAMPS, TACS, and ETACS are commonly referred to as first generation ("1G") systems. Wireless digital systems currently in use such as, GSM, TDMA (IS-136) and CDMA (IS-95), are referred to as second generation systems ("2G"). 1G and 2G wireless systems primarily offer voice services and other messaging capabilities such as SMS and access to data networks via Circuit Switched Data (CSD) and High Speed Circuit Switch Data (HSCD). However, the 1G and 2G wireless systems are not designed to handle rich multimedia wireless data services in an "always-on" packet-based wireless environment, which mobile users are demanding.

Third generation ("3G") wireless systems were designed to handle rich multimedia services that enable video, audio, person-to-person communication and higher data transfer rates to enhance the ability to offer 3G mobile users access to more data on private and public data networks. Current 3G technologies are generally referred to as Wide Code Division Multiple Access (WCDMA) for Universal Mobile Telecommunications System (UMTS) also known as 3GPP, cdma2000 (3GPP2), and EDGE. 3GPP and 3GPP2 define the technical standards supporting the most common 3G technologies and provide a framework for the ongoing work to define future standards. UMTS is a stand-alone wireless technology, where EDGE, cdma2000 and GPRS are upgrade technology solutions for current 2.5G (e.g., GPRS) and 3G GSM and CDMA (IS-95) Mobile Network Operators (MNOs). In general, both 2.5G and 3G technologies offer packet-based communication, which is always on, different from 1G and 2G systems.

It is generally believed that data content, other than voice, will increasingly be a major source of revenue for mobile network operators. It is predicted that in the near future there will be more wireless devices accessing networks such as the Internet than fixed line devices. To help ensure a robust business growth, it is understood that QoS service levels must meet mobile subscribers' expectations. Therefore, for mobile users to experience rich multimedia services, mobile network operators and companies will have to ensure that the network is maintaining proper QoS levels and/or SLA (Service Level Agreement) standards. Unfortunately, both 2.5G and 3G technologies are proving to have several problems with respect to managing their QoS levels.

Currently, mobile network operators monitor QoS to manage network performance from a mobile infrastructure perspective. Others have attempted to measure QoS performance using available technologies that measure from the base station, terrestrial networks linking the base stations, UTRAN controllers, gateways to the core, the core itself, remote peripheral networks (fixed and mobile) and IT infrastructure. Others have provided solutions for QoS monitoring of packet-based transmission infrastructure. Currently, 3GPP, 3GPP2, TMF, eTOM, ETSI, QoS Forum, Eurescom, ETR and ITU, among others have outlined specifications for taking QoS measurements from the mobile infrastructure.

While, fixed line and server based QoS technology solution space is a mature market, a general knowledge of these technologies is important to expand common methodologies into the packet-based wireless QoS technology space, especially in view of monitoring QoS across the mobile environment, and particularly at the mobile device level. Further, integrating handheld level QoS monitoring into existing systems requires that the QoS monitoring method operate with existing network systems and integrate with existing wireless standards such as 3GPP to ensure a high-level of QoS.

Therefore, what is needed is a method and system to monitor QoS in networks including mobile devices without reducing communication efficiency and increasing cost and complexity for mobile network operators and companies. Additionally, what is needed is a method and system that will provide an optimum packet-based mobile service experience for consumers of mobile network access.

SUMMARY OF THE INVENTION

An aspect of the present invention provides a method of monitoring quality of service associated with a wireless network including at least one wireless device and fixed transceiver. The method includes processing quality of service data in a manner relevant to determining a quality of service, and wirelessly providing the processed data to the fixed transceiver.

An aspect of the present invention provides a method of monitoring quality of service in a wireless device in communication with a transceiver. The method includes testing a status of a signal handled by the wireless device and reporting the signal status to the transceiver.

An aspect of the present invention provides a wireless device. The wireless device includes a transceiver configured to communicate with a wireless network, a processor configured to process quality of service data in a manner relevant to determining a quality of service, and a messaging device configured to provide the processed data to the wireless network.

An aspect of the present invention provides a wireless communications system. The wireless communication system includes at least one wireless device in communication with a transceiver, a processor coupled to the wireless device, the processor configured to process quality of service data in a manner relevant to determining quality of service, and an output device coupled to the wireless device and configured to provide the processed data to the transceiver.

BRIEF DESCRIPTION OF THE DRAWINGS

So that the manner in which the above recited features, advantages and objects of the present invention are attained and can be understood in detail, a more particular description of the present invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

DETAILED DESCRIPTION OF THE PREFERRED EMBODIMENT

Figure 1:
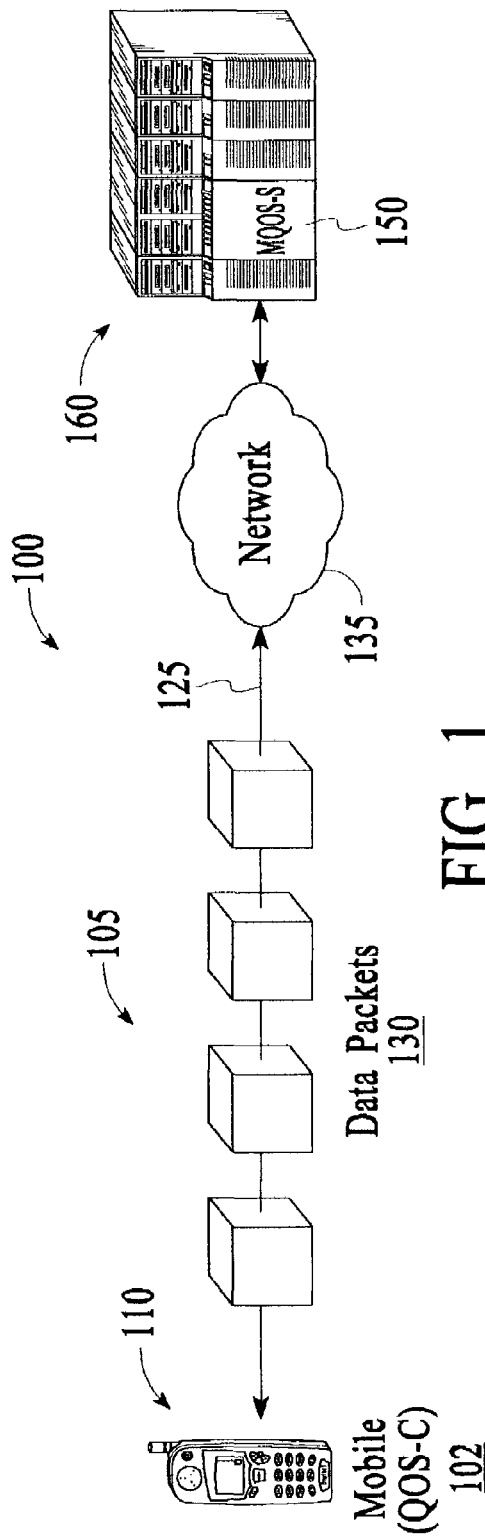
FIG. 1 is a high-level block diagram of one embodiment of a MQoS system according to the present invention.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Generally, the present invention is a Quality of Service (QoS) system that is particularly well suited for the needs of packet-based wireless network environments such as 2.5G, 3G, and the like. The present invention is described in terms of a packet-based network environment described with specification and standards such as 3GPP, however other standards are contemplated. Monitoring mobile QoS (MQOS) on a subscriber-specific basis within mobile devices may be referred to herein as Quality of Experience (QoE), a term developed by the inventors as an aspect of the present invention. For clarity, the terms MQoS and QoE may be considered equivalent as used herein. For purposes of further clarity, the MQoS system of the present invention is described in terms of data collection at the mobile device of wireless transmitted data. However, other network elements are contemplated. As described herein, data is defined as any data transmitted by or within a network hosting at least one mobile device, including data that is serving locations or point to point connections, such as a video call.

Aspects of the present invention will be described in terms of systems and methods for calculating and detecting faults in wireless packet communications when they occur and package information documenting such faults and providing detailed analysis and reports for technicians and management. However, it will be understood by those skilled in the art to which the present invention pertains that such systems and methods are merely representative of a plurality of aspects of the present invention. For clarity, embodiments of the present invention will be described in terms of a radio terminal (e.g., mobile device), or handset, for collection of the data from multiple points, such mobile devices including a protocol stack, and various functions such as error detection, routing, timing, and others. Furthermore, the inventors recognize that newly developed technologies not now known may also be substituted for the described parts and still not depart from the scope of the present invention. All other described items, including, but not limited to servers, programming steps, timestamps, collected statistics, messages produced, sent and received, and processing performed on statistics or data for analysis, etc. should also be considered in light of any and all available equivalents. Moreover, in describing embodiments of the present invention illustrated in the drawings, specific terminology is employed for the sake of clarity. However, the present invention is not intended to be limited to the specific terminology so selected, and it is to be understood that each specific element includes all technical equivalents that operate in a similar manner. For example, when describing an OSI layer based protocol stack, any other device or protocol having an equivalent function or capability, whether or not listed herein, may be substituted therewith. It is understood that other devices may be similarly used for such data collection.

Aspects of the present invention may be flexibly applied to many different protocols and communications systems. Aspects of the MQoS system of the present invention break down the radio terminal into categories for monitoring MQoS metrics, each of which can handle substantial amounts of data that specifically identifies certain performance characteristics or qualities of the handset/network. Exemplary categories include but are not limited to:

Mobile Handset's Hardware and Radio
Data Communication (e.g., monitoring IP stack layers such as the physical layer)
Network (e.g., network transitions or roaming)
Configurations
Location and Timestamp
OS (Operating System)
Software Applications
Start Algorithm
Digital Rights Management
Monitor performance between content providers
Monitor mobile device quality between mobile device manufacturers (e.g., performance by mobile device type, model, etc.)

Other examples may include a mobile device radio Interface, an IP stack that sits on top of such a radio interface, IETF protocols that use an IP stack such as RTP, RDP and other methodologies of data transmission and applications that use the infrastructure including their codecs, protocols and the like.

Portions of the present invention may be implemented using a computer or microprocessor programmed according to the teachings of the present disclosure, as will be apparent to those skilled in the computer art. Moreover, portions of the present invention may be implemented by the preparation of application specific integrated circuits or by interconnecting an appropriate network of conventional component circuits, as will be readily apparent to those skilled in the art based on the present disclosure.

One embodiment of the present invention include a computer program product which is a storage medium (media) having instructions stored thereon/in which can be used to control, or cause, a computer to perform any of the processes of the present invention. The storage medium may include, but is not limited to, any type of disk including floppy disks, mini disks (MD's), optical discs, DVD, CD-ROMS, microdrive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling at least a portion of both the hardware of the computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described herein.

Included in the programming (software) of a computer or microprocessor are software modules. Software modules may be used for implementing the teachings of the present invention, including, but not limited to, applying time stamps, recognizing faults, preparing statistics, messages, entering technical data (ratios, etc.), setting up parameters for statistical evaluation, storing and transmitting data, and the display, storage, or communication of results according to the processes of the present invention.

The software described herein may use any one of a number of different programming languages. Appropriate software coding can readily be prepared by skilled programmers based on the teachings of the present disclosure, as will be apparent to those skilled in the software art. For example, the program code can be written in PLC code (e.g., ladder logic), a higher-level language such as C, C++, Java, or a number of other languages. While the software described herein may be a standalone program, it is contemplated that such programming may be combined with other programs for use therewith such as an OS of a mobile device 110 or part of a software module used therein.

Acronyms
3GPP 3rd Generation Partnership Project
API Application Program Interface
ASP Application Service Provider
CSD Circuit Switched Data
AMPS Advanced Mobile Phone Service
NAMPS Narrow Advanced Mobile Phone Service
API Application Program Interface
ASP Application Service Provider
BLER Block Error Rate for Data
CSD Circuit Switched Data
CDMA Code Division Multiple Access
CDMA2000 Multicarrier CDMA (1×RTT)
EBNR Energy per Bit to Noise Ratio
ECNR Energy per Chip to Noise Ratio
FTP File Transfer Protocol
EDGE Enhanced Datarate for GSM Evolution
EMS Enhanced Message Service
ETACS European Terminal Access Conversion Service
FER Frame Error Rate for Voice
GPRS General Packet Radio Service
GPS Global Positioning System
GSM Global System for Mobile Communications
HSCD High Speed Circuit Switch Data
HTTP Hypertext Transfer Protocol
ICMP Internet Control Messaging Protocol
IP Internet Protocol
J2ME Java to Mobile Equipment
JNI Java Native Interface
JVM Java Virtual Machine
KVM K Virtual Machine
ME Mobile Equipment
MIB Management Information Base
MMI Man-Machine Interface
MMS Multimedia Message Service
MNO Mobile Network Operator
MP3 Digital Music
MVNO Mobile Virtual Network Operator
OS Operating System
OTA Over The Air
Q Q Technologies
MQoS Quality of Experience
QoS Quality of Service
QM Q-Monitor™
QMC Q-Monitor™-Client
QMS Q-Monitor™-Server
RSSI Received Signal Strength Indicator
R&TTE European Union Radio & Telecommunications Terminal Equipment Directive Compliance (TACS)
RTP Real-time Transport Protocol
SIM Subscriber Identify Module
SIR Signal to Interference Ratio
SLA Service Level Agreement
SMS Short Message Service
SMS-C Short Message Service Center
SQL Structured Query Language
TACS Terminal Access Conversion Service
TCP Transmission Control Protocol
TDMA Time Division Multiple Access
UDP User Datagram Protocol UMTS Universal Mobile Telecommunication System
USAT USIM Application Toolkit
USIM Universal Subscriber Identity Module
UTRAN UMTS Terrestrial Radio Access Network
WCDMA Wide Code Division Multiple Access for use in UMTS systems
JDK Java Development Kit
JAAS Java Authorization & Authentication Service
JMS Java Message Service
JMX Java Management Extensions
SNMP Simple Network Management Protocol
NMS Network Management System
MIB Management Information Base
JDBC Java Database Connectivity
JNDI Java Naming and Directory Interface
JSP Java Server Pages
MVC Model View Controller
NIO Network IO
XML Extensible Markup Language
SOAP Simple Object Access Protocol
XSD XML Schema
DTD XML Document Type Definition
VIP Virtual IP
NIC Network Interface Card
VLAN Virtual Local Area Network
PAM Pluggable Authentication Module
LDAP Lightweight Directory Access Protocol End-to-End Overview FIG. 1 is a high-level end-to-end diagram of one embodiment of a wireless network system 100 according to aspects of the present invention. Wireless network system 100 includes MQoS system 105. MQoS system 105 is divided into two components, client (MQoS-C) 102 and server (MQoS-S) 150. In one aspect, MQoS-S 150 resides at a backend MQoS server 160 which may be part of, or coupled to, a base station (i.e. transceiver) wirelessly connected to mobile device 110. MQoS-C 102 may include a plurality of test routines that access parts of the mobile device 110. For purposes of clarity, MQoS-C 102 is described below as embedded within one or more mobile devices 110 (mobile ends) such as mobile device 110. However, MQoS-C 102 may be implemented as software embedded within other devices and software programming such as the OS of mobile device 110, software embedded within the OS of a SIM or USIM, a J2ME Application, JavaCard Application, and the like. If MQoS-C 102 is developed as a J2ME or a JavaCard application, MQoS-C 102 may take advantage of one or more current implemented APIs to collect MQoS data and use Java applications for APIs that are not supported by a MNO or ASP (at the network management end). MQoS-C 102 preferably includes a plurality of processes and algorithms to monitor and measure MQoS at the mobile device 110 as described below.

In one embodiment, the present invention measures and monitors MQoS of mobile device 110. MQoS system 105 determines if the mobile device 110 and at least some components therein are functioning at a sufficient MQoS level, preferably before monitoring and measuring other MQoS aspects of the mobile device 110 such as data communication, network, configurations, location and timestamp, OS, and software applications described below. In one embodiment, MQoS-C 102 resides in a mobile device 110 or portion thereof such as a SIM/USIM module, and the like. MQoS-C 102 may be used to determine and report data or other factors describing the mobile subscriber's experience to MQoS-S 150 described herein.

In order to provide a control link between the MQoS-C 102 and MQoS-S 150 wireless network 100 includes control channel 125. Control channel 125 is configured to allow the mobile 110 and network management ends to move data packets 130, configure the MQoS-C 102 and other control commands (e.g., data packets 130). Control channel 125 may implemented on a packet channel that provides communications such as 2.5G/3G communications, or, alternatively can be a channel separate from 2.5G/3G communications. A packet channel may be part of a network 135 such as a GSM 3G network, and the like.

MQoS-C Metrics

The following sections outline the basic MQoS measurement categories (i.e., MQoS metrics), with some specifics as to those measurements. It should be noted that the present invention is not limited to measurement features disclosed in this document. It is contemplated that each measurement feature described herein may be configured to expand and allow creation derivative features as they are developed.

In one aspect, MQoS system 105 monitors and processes a plurality of performance aspects of MQoS for mobile device 110. Some performance aspects of MQoS will be described herein in terms of a plurality of MQoS metrics, some of which are listed immediately below. MQoS metric data, such as recordings, may be sent from the MQoS-C 102 to MQoS-S 150 for storage, analysis, and reporting as described below. MQoS metrics include but are not limited to:

Location
Identification (e.g. IMEI, MSISDN, and ICCID)
Configuration (e.g. model of terminal, OS version, OS type, and loaded applications, etc.)
Time & Date of Terminal
Timestamp (i.e. date and time of MQoS monitoring)
Bandwidth
Inter-packet Delay (Jitter)
Round Trip Delay
One Way Delay
Packet Loss
Customer Service Agent Test
User Self Test
Connection Type (e.g. Bluetooth, infrared, or UMTS)
Bit Error Rate (BER)
Block Error Rate for Data (BLER)
Frame Error Rate for Voice (FER)
Packet Retransmission
Battery Strength (i.e. charging behavior)
Signal to Interference Ratio (SIR)
Received Signal Strength Indicator (RSSI)
Energy per Bit to Noise Ratio (EBNR)
Energy per Chip Noise Ratio (ECNR)
Dropped Connections
Connection Time (i.e. success and failure)
Terminal Memory Usage (e.g. dynamic)
Terminal Diagnostics
Network Transitions (Moving From 2G, 2.5G, or 3G)
MTU and ATU Analysis MQoS-C 102 may be configured to record, measure, process, and provide data indicative of one or more of the above MQoS metrics, and other MQoS attributes to the network system 100. For example, FIGS. 2-6 illustrates high-level diagrams of some MQoS metrics listed above and measurement methodologies described herein.

Figure 2:
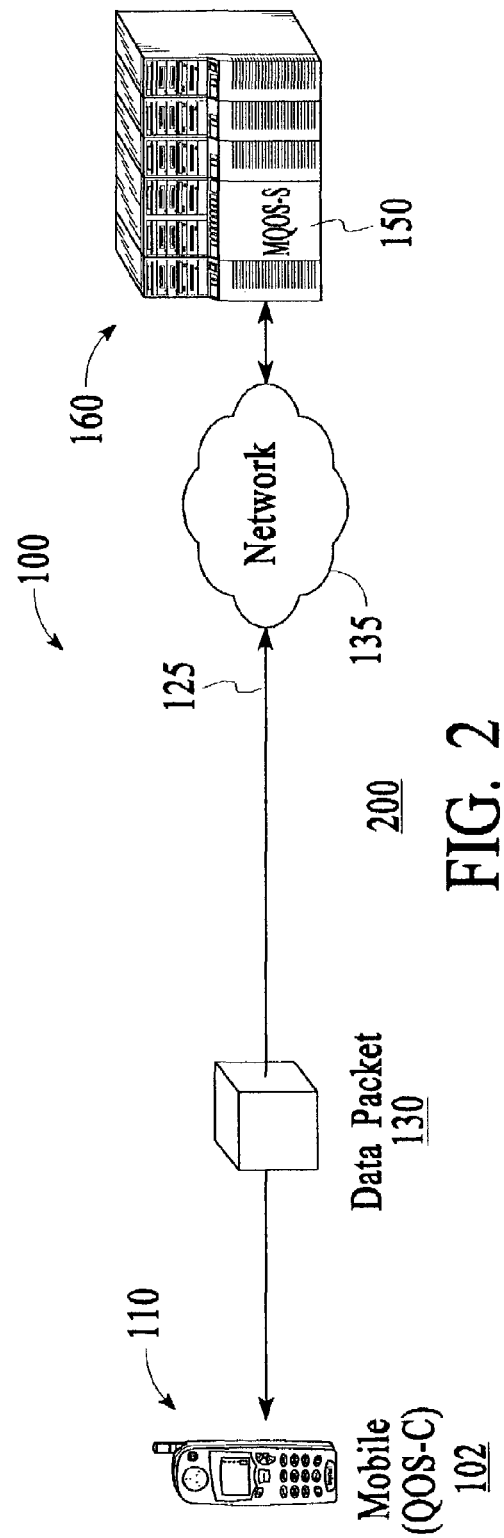
FIG. 2 is a high-level block diagram of a MQoS metric illustrating one-way delay situation in accordance with aspects of the present invention.

FIG. 2 is a block diagram 200 of a MQoS metric illustrating a one-way delay situation in accordance with the present invention. One-way delay is the time it takes for a data packet sent from the wireless network 100 to be received by mobile device 110. In one aspect, MQoS-C 102 and MQoS-S collaboratively measure an average time for at least one data packet 130 to be sent over wireless network 100, as described further below. MQoS-C 102 may provide such time, or an average time derived over several instances, to MQoS-S 150 for storage and analysis.

Figure 3:
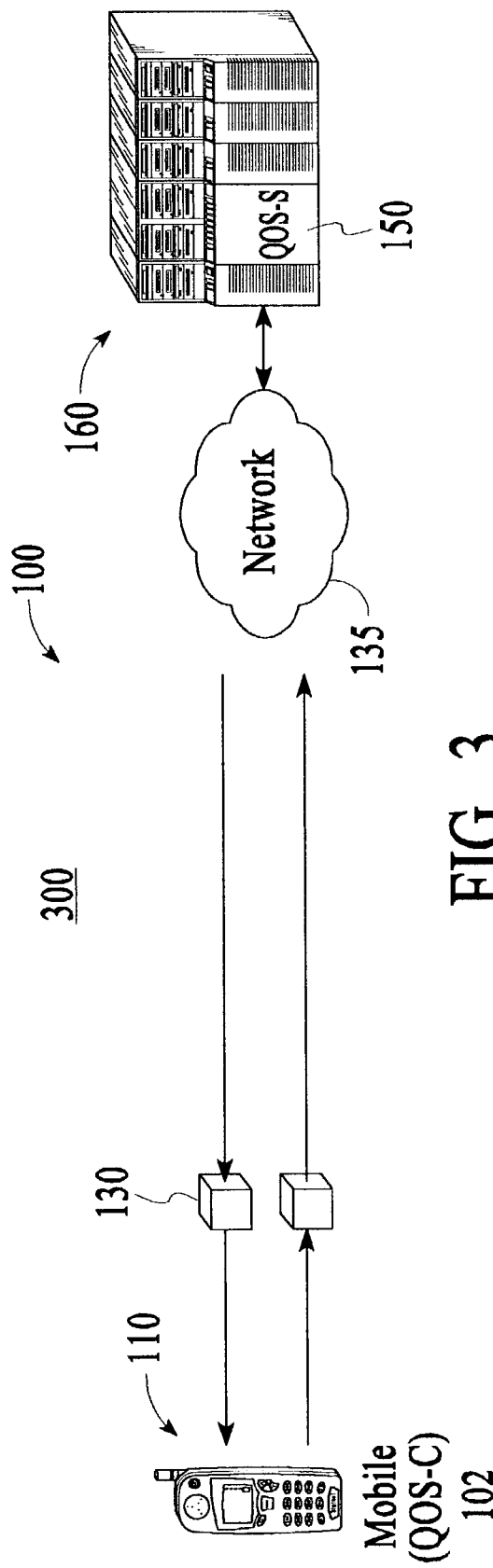
FIG. 3 is a high-level block diagram illustrating a MQoS round trip delay metric in accordance with aspects of the present invention.

FIG. 3 is a high-level diagram 300 illustrating a MQoS round trip delay metric in accordance with aspects of the present invention. In one aspect, MQoS-C 102 monitors and measures a round trip delay for one or more packets 130 sent to server MQoS 160. MQoS-C 102 measures the round trip delay from the mobile device 110 to the server 160 and back, or from the server 160 to the mobile device 110 and back. Round trip delay is the time it takes a data packet 130 sent by the wireless network 100 to the mobile device 110 and then sent back to the wireless network 100. In one embodiment, MQoS-S 150 encodes a timestamp in a data packet and sends it to a compliant mobile device 110 via wireless network 100. When mobile device 110 receives such data packet 130, MQoS-C 102 may instruct mobile device 110 to reply to MQoS-S 150 using the same data packet 130 received. Such round trip delay information may be stored by MQoS-S 150 in a database for analysis and reporting.

Figure 4:
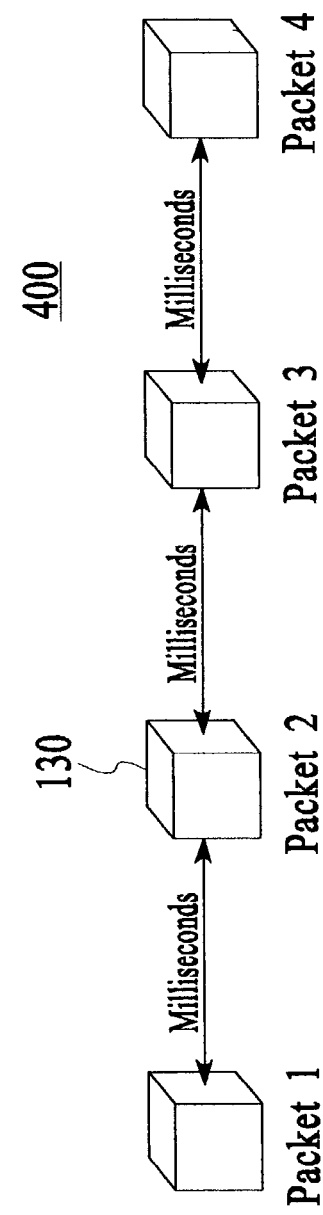
FIG. 4 is a high-level block diagram illustrating a MQoS inter-packet delay metric in accordance with aspects of the present invention.

FIG. 4 is a high-level diagram 400 illustrating one MQoS Inter-packet delay metric in accordance with aspects of the present invention. In one aspect, MQoS-C 102 monitors and measures MQoS Inter-packet delay (i.e., jitter) as described further below. Inter-packet delay is the time difference between each data packet 130 received. MQoS-C 102 measures and processes elapsed time between data packets 130 transmitted over wireless network 100. In one embodiment, described below MQoS-C 102 uses one or more protocols such as UDP/Multicast or Connectionless protocols and TCP to determine the inter-packet delay. Inter-packet delay may include a plurality of delays such as TCP delay, loss rate for UDP, and the like. In another aspect, MQoS-C 102 encodes packets with inter-packet delay data to monitor protocol layers such as the application layer. In one aspect, MQoS-C 102 monitors and measures the inter-packet delay of the data communication between the mobile device 110 and the wireless network 100. These measurements may be recorded in different categories based on the data class type. The location and timestamp may be recorded along with the inter-packet delay recordings, respectively, to determine the health of wireless network 100 based on time and location. For example, if the results of the football world cup were being announced and subscribers are viewing a video feed, the wireless network operator may want to know if their subscribers were able to view it. Such MQoS recordings may be sent to MQoS-S 150 for storage, analysis, and reporting.

Figure 5:
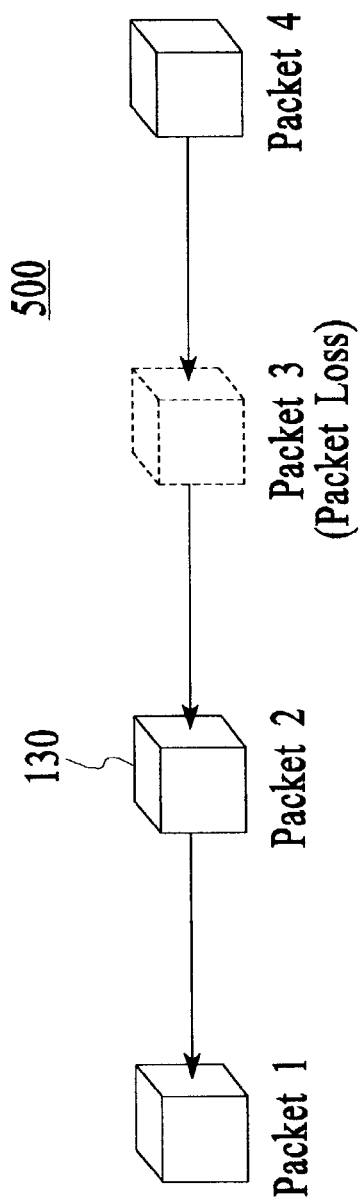
FIG. 5 is a high-level block diagram illustrating a MQoS packet loss metric in accordance with aspects of the present invention.

FIG. 5 is a high-level diagram 500 illustrating one MQoS packet loss metric in accordance with aspects of the present invention. MQoS-C 102 measures packets 130 lost during transmission over wireless network 100. MQoS-C 102 monitors and measures the packet loss for data communication between the mobile device 110 and the wireless network 100. These measurements may be recorded in different categories based on the data class type. The location and timestamp are also recorded along with the packet loss recordings, respectively, to determine the health of the network based on time and location. Such MQoS recordings may be sent from MQoS-C 102 to MQoS-S 150 for storage, analysis, and reporting.

Figure 6:
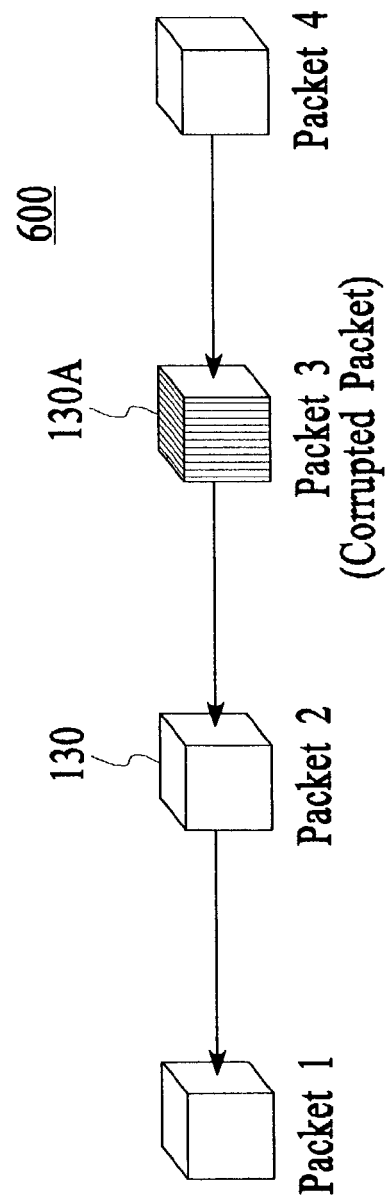
FIG. 6 is a high-level block diagram illustrating a MQOS corrupted packet metric in accordance with aspects of the present invention.

FIG. 6 is a high-level diagram 600 illustrating a MQoS metric for corrupted packets 130A in accordance with aspects of the present invention. MQoS-C 102 measures any package corruption that occurs during transmission of data packets 130 as described in more detail below. For example, MQoS-C 102 may monitor and measure packet corruption due to aspects related to BER, BLER, FER as described herein.

Figure 7:
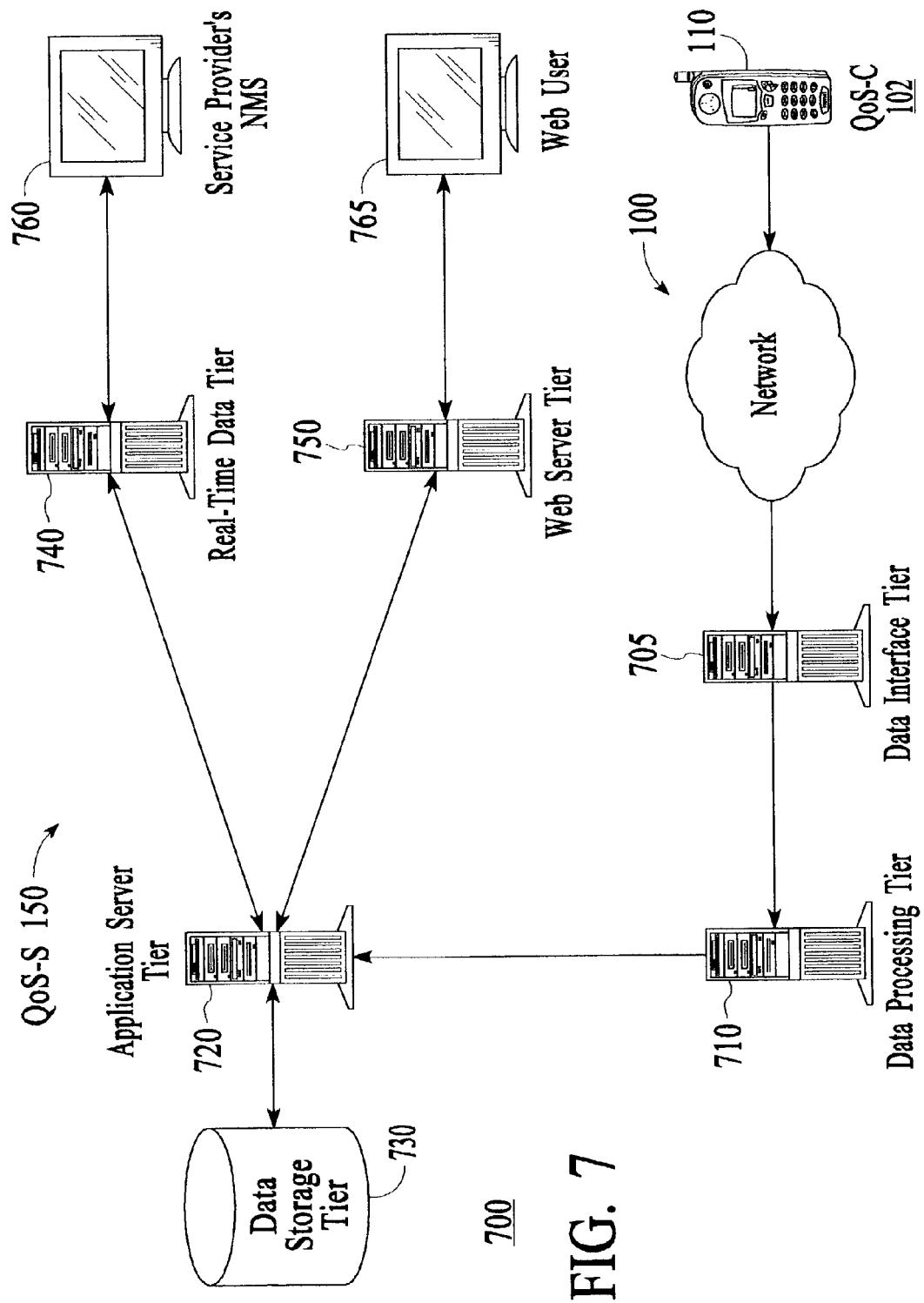
FIG. 7 is a high-level block diagram 700 illustrating one embodiment of a MQoS system level architecture in accordance with aspects of the present invention.

FIG. 7 is a high-level block diagram 700 illustrating one embodiment of a MQoS-S 150 of FIG. 1 in accordance with aspects of the present invention. FIG. 7 illustrates a mobile device 110 wirelessly coupled to MQoS-S 150 via wireless network system 100. MQoS-S 150 includes data interface tier 705 coupled to data processing tier 710. Data processing tier 710 is coupled to data application server tier 720. Data application server tier 720 is coupled to an Internet web server tier 750 and real-time data tier 740. In one aspect, application server tier 720 is coupled to data storage tier 730. Data application server tier 720 may be a J2EE application server that contains J2EE technologies such as JAAS, Servlet, JSP, EJB, Struts, Axis (SOAP) and more. In one aspect, data application server tier 720 controls at least some access to the MQoS system 150 including for example, a simple help desk interface. Data application server tier 720 may provide a SOAP interface to access collected statistics and to control the platform. In one configuration, Data application server tier 720 allows users to configure and interact with the MQoS system 150, and accomplish tasks such as viewing reports using methodologies such as Struts, JSP, Taglibs, and the like. Real-time data tier 740 is coupled to a service provider NMS 760. Internet web server tier 750 is coupled to an Internet user interface 765 such as an Internet browser.

Figure 7A:
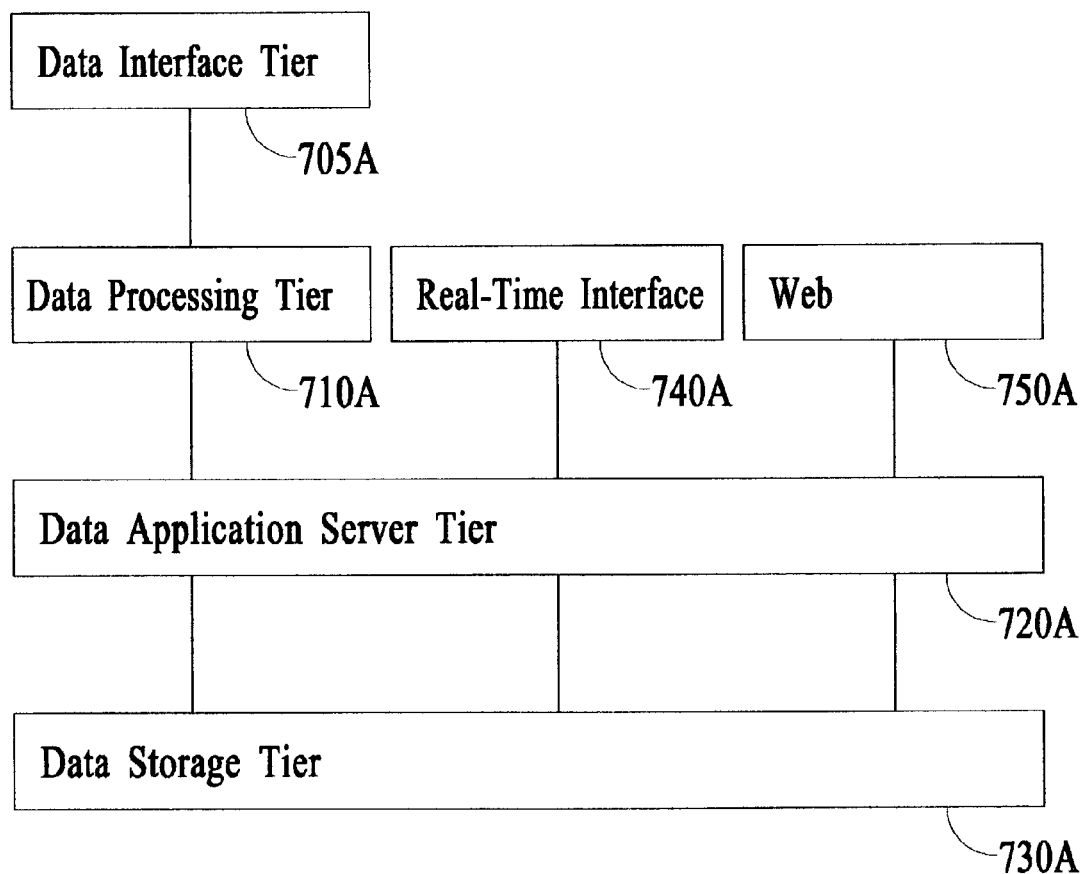
FIG. 7A illustrates one embodiment of a multi-tier platform of FIG. 7 in accordance with aspects of the present invention.

FIG. 7A graphically illustrates one embodiment of a multi-tier MQoS-S 150 platform of FIG. 7 in accordance with the present invention. Interconnections illustrate that MQoS-S 150 may be a multi-tier platform consisting generally of six logical areas of responsibility (i.e., tiers). Such six levels of responsibility provide scalability, inter-operability, data processing, data input, and a data presentation tier for MQoS data. The multi-tier architecture provides the ability for MQoS-S 150 to collect information from the MQoS-C 102 via a variety of wireless communication systems such as 2G, 2.5G and 3G.

MQoS-S 150 includes data interface tier 705A which interfaces mobile devices 110 having MQoS-C 102 to networks 102 such as 2G, 2.5G and 3G. Data interface tier 705A normalizes the incoming data (e.g., traffic) from the MQoS-C 102 and submits the unified information to the data processing tier 710A. In one aspect, the data interface tier 705A includes a plurality of protocol adapters to communicate with MQoS-C 102. The data interface tier 705A may also contain sub-systems for in stream analysis and bandwidth tests of MQoS of mobile devices 110.

In one aspect, data processing tier 710A is configured as a "data scrubbing area" to qualify, compact, prepare, and unify the data collected. Data processing tier 710A may include an application server that provides common message queuing, transaction integrity, service locators and database interfaces for storing unified data. Data processing tier 710A processes, summarizes and scrubs incoming information to ensure that the data is properly formatted and that it is packaged in a manner ready for input into the data application server tier 720A. Data processing tier 710A also is responsible for compressing and decompressing data that is received and sent to the mobile device 110, terminal, and the like.

Data application server tier 720A manages message queuing, acts as a lookup provider for all other tiers, transaction management, real-time information output, presentation tier interfaces and the interface to the database or data store such as data storage tier 730A.

Data storage tier 730A is configured to store the information that is processed and received from MQoS-C 102. In one aspect, data storage tier 730A may include a commercially scaleable database server.

In another aspect of the present invention, real-time data tier 740A is configured to provide MQoS-S 150 a real-time information output about the network to, for example, NMS 760. In one aspect, this information may be used for automated reactive systems to correct issues with wireless network 100. Real-time data tier 740A may be configured to present data in real-time to a service provider. Such data may consist of custom fed data, SNMP queryable MIBs and the fruits of SNMP trapping of information for proactive and real-time management. Real-time data tier 740A may use adaptors to feed monitoring systems information, such as Legacy information, and the like.

In one aspect, Internet web server tier 750A presents information about the network 100 to an end client. For example. Internet web server tier 750A may consist of one or more web servers that interact with the data application server tier 720A to provide information to end-users. Such information may include ad-hoc queries, simple network monitoring pages, MQoS-S 150 management instructions, and the like.

Figure 8:
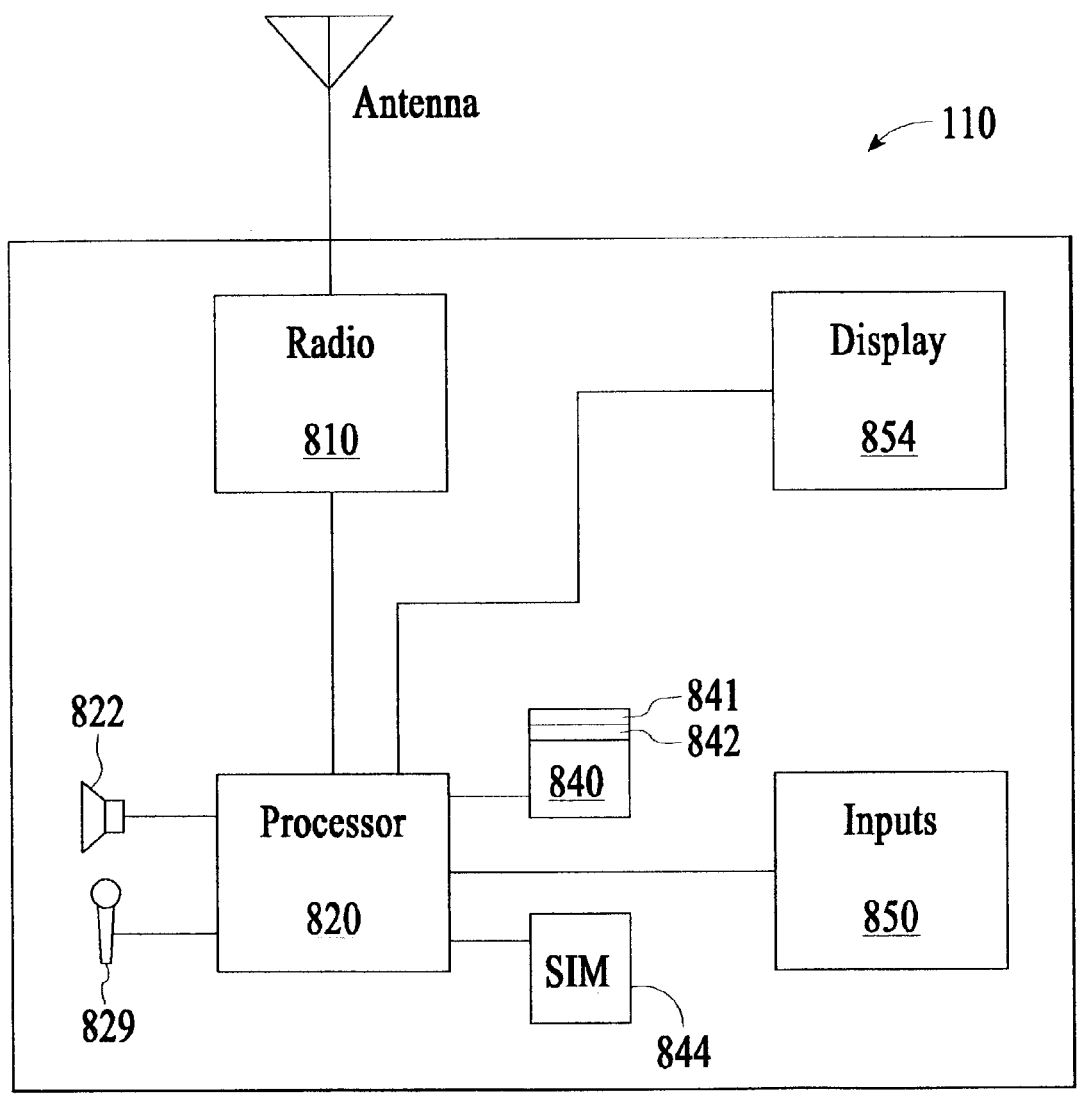
FIG. 8 is a block diagram of one embodiment of a mobile device in accordance with aspects of the present invention.

FIG. 8 is a block diagram of one embodiment of a mobile device 110 in accordance with aspects of the present invention. Mobile device 110 includes a radio 810 (e.g., transceiver) coupled to the processing unit 820. The processing unit 820 may be coupled to auditory devices such as speaker(s) 822 and microphone(s) 824. Processing unit 820 may also be coupled to memory 840, SIM module 844, input device 850 (e.g., keypad, touch screen, etc.), and a display device 854. Memory 840 includes space for at least an OS 841, and programming of the MQoS-C 102 (e.g., see FIG. 9 described below). In one aspect, OS 841 and MQoS-C 102 may reside in separate memory modules or be otherwise coupled to the mobile device 110 (e.g., memory 840 or SIM 844) in parts configured to store at least a portion of O/S 841 and MQoS-C 102. For example, MQoS-C 102 may be stored in a memory location 842. In another embodiment, the MQoS-C 102 resides in mobile device 110 or SIM such as SIM module 844 to monitor and measure a plurality of aspects of MQoS for the mobile device 110. Generally, the mobile device 110 is divided into parts including radio 810 and hardware such as touch pad inputs, display, microphones, etc. In one aspect, the touch pad inputs may be used by a user to input data about MQoS to QoS system 105. For example, if the user is experiencing poor received signal strength causing a poor video image on display device 854, the user may activate a poor MQoS alert to the MqoS-C 102 using a special key or touch pad input which is then transmitted to MQoS-S 150.

Figure 9:
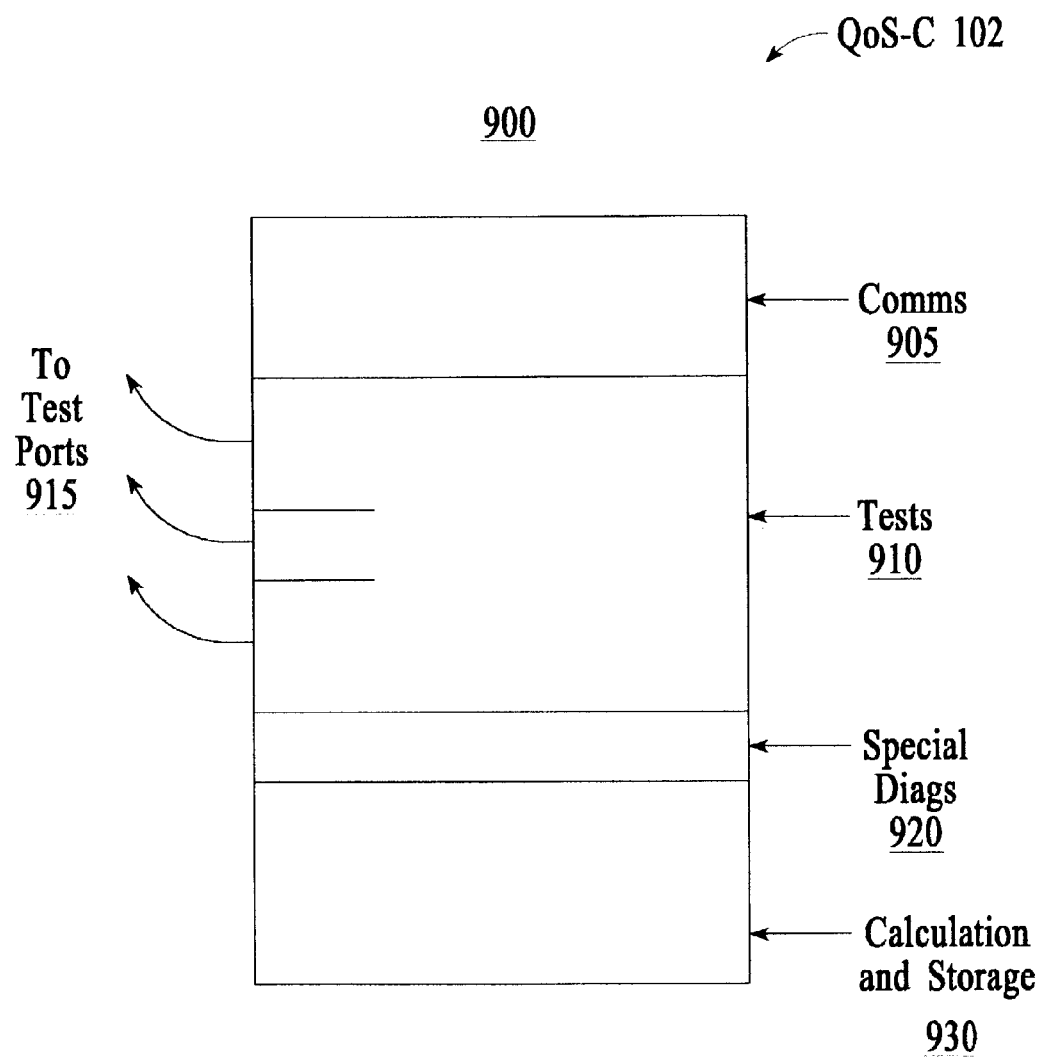
FIG. 9 is a high-level block diagram of one embodiment of QOS-C processes in accordance with aspects of the present invention.

FIG. 9 is a block diagram 900 illustrating one embodiment of MQoS-C 102 processes and programming in accordance with aspects of the present invention. The MQoS-C 102 may include a plurality of communication routines 905 that perform receipt of status requests, call center tests, etc., some of which are described in more detail below. A plurality of test routines 910 may be configured to perform individual tests (e.g., RSSI, etc.), or a set of pre-selected tests (e.g., hardware tests, start-up test, complete diagnostics, etc.). Combination of test routines 910 for specific tests, such as complete diagnostics, may be made using one or more of the other tests and a subroutine of the combination test. In one aspect, the test routines 910 are configured to read and write to test port access lines 915. Test port access lines 915 may be included in mobile device 110 to enable external access to features and MQoS metrics that are being tested by the test routines 910.

In one embodiment, MQoS-C 102 includes a set of special diagnostics 920 for performing other features such as intelligence-based testing, test results display, and other special features. In one embodiment, special diagnostics 920 includes retrieval of a last operation performed by a user of the mobile device 110 before a user initiates a self-test. Results of such a self-test may be displayed to a user, for example, on a display device such as display 854 described above. In one aspect, the self-test display may include an explanation why the previous action by a user may have been unsatisfactory or incomplete. For example, if a user orders a video clip, and then moves from a 3G network to a 1G network, the special diagnostics 920 may include a message with the self-test indicating a user moved into a 1G network and therefore video clips cannot be transferred. In one embodiment, special diagnostics 920 may also determine the location of a user (e.g., via location stamp), and calculate a movement of a user needed to re-enter the 3G network. Special diagnostics 920 may indicate to a user that movement in a specific direction will allow entry to a specific network (e.g., to go 100 yards east to enter the wireless network 100).

In one aspect of the present invention, MQoS-C 102 may include calculation and storage routines 930. Calculation and storage routines 930 provided may utilize individual test results to determine other test results. The calculation and storage routines 930 may also provide scheduling and timing of periodic or event driven tests. In one embodiment, at least a portion of raw data from the individual test results is transmitted directly to MQoS-S 150 for further calculation or storage.

MQoS System Operation

Figure 10:
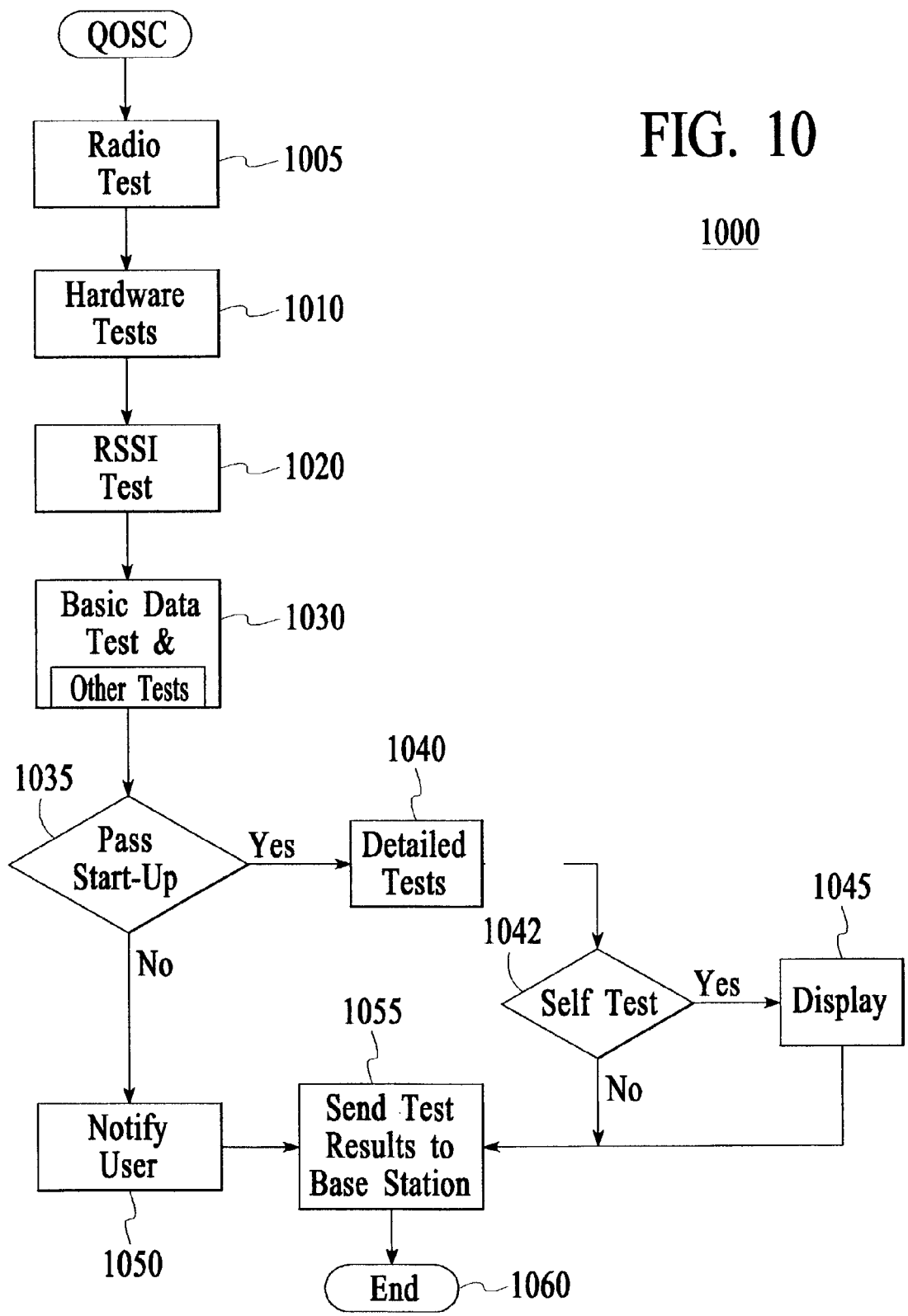
FIG. 10 is a flow chart illustrating one embodiment of a MQoS-C measurement and monitoring process in accordance with aspects of the present invention.

FIG. 10 is a high-level flow chart illustrating one embodiment of a MQoS measurement and monitoring method 1000 in accordance with the present invention. Method 1000 may be entered into for example when MQoS-C 102 is activated. Upon initiation of MQoS monitoring, a radio test is performed at 1005. The radio test includes tests that determine the radio's reception and broadcast functionalities. If the radio test does not meet a minimum operational MQoS level, no further tests are necessary. However, if at least some radio functionality is available, additional tests are performed. At 1010, hardware of mobile device 110 is tested. Some hardware tests include but are not limited to functional tests of any one or combinations of microphone tests, processor tests, memory tests, display tests, input tests, SIM/SIM tests, and the like. At 1020, a RSSI test is performed. At 1030 a basic data test and other tests described herein are also performed. For example, method 1005 tests if the phone can functionally pass data between the various test ports 915, etc. If at 1035 a startup test passes, at 1040 a set of detailed tests for MQoS as described herein may be performed, some of which are described below. Upon completion of the detailed tests, method 1000 determines if a self-test is being performed at 1042. If at 1042 such test is a self-test initiated for example by the mobile device users, then, at 1045 test results are displayed on a display device such as display 854 and method 1000 proceeds to 1055. Display of the test results may include processing adaptable to display the results in a way that most likely answers the reason the mobile device user initiated the self test. At 1055, results of the tests are wirelessly provided via wireless network 100 to MQoS-S 150. At step 1035, if the startup test fails, a notification is sent at 1050 to, for example, a user, and method 1000 proceeds to 1055. Method 1000 ends at 1060. Based on the present disclosure, many variations of method 1000 are contemplated, and any such variations should also be considered within the spirit and scope of the present invention.

Mobile Device Tests

In one aspect, at least some MQoS tests described herein and recordings of metrics such as RSSI at the mobile device 110 may be used to test the mobile device 110 and also help the network provider determine the health of the network, network coverage, uncover fraud, mobile device quality, etc. For example, RSSI may be used to detect fraudulent activity or loss of signal by a subscriber. Consider the case where a subscriber is watching a streaming video clip while the RSSI and EBNR or ECNR are high and the subscriber reports abnormal behavior in watching the video clip; chances are good the subscriber is trying to defraud the network. In another example, if the RSSI is low and the ENBR or ECNR is high while watching a video clip and there is abnormal behavior in viewing the video clip, chances are the subscriber lost coverage. For example, RSSI may be measured by MQoS-C 102 sending a USAT command "PROVIDE LOCAL INFORMATION" to MQoS-S 150.

MQoS-C 102 may be used to monitor and measure the signal to interference ratio (SIR). These MQoS recordings may be sent to MQoS-S 150 for storage, analysis, and reporting. These recordings may be utilized by the network provider to determine the health of the network, network coverage, and help prevent fraud.

MQoS-C 102 may be used to monitor and measure the energy per bit noise ratio (EBNR). Such MQoS EBNR recordings may be sent to MQoS-S 150 for storage, analysis, and reporting. Such MQoS EBNR recordings may be utilized by the network provider to determine the health of the network, network coverage, and help prevent fraud.

MQoS-C 102 may be used to monitor and measure the energy per chip noise ratio (ECNR). These MQoS ECNR recordings may be sent to MQoS-S 150 for storage, analysis, and reporting. These MQoS ECNR recordings may be utilized by the network provider to determine the health of the network, network coverage, and help prevent fraud.

System Tests

MQoS system 105 provides a plurality of methodologies to examine and process MQoS metrics between mobile device 110 and wireless network system 100. In one embodiment, MQoS system 105 determines mobile device 110 identification. The identification is broken down into the IMEI of the terminal, ICCID of the USIM, and the MSISDN. In one aspect, IMEI is retrieved by MQoS-C 102 sending USAT command "PROVIDE LOCAL INFORMATION" to MQoS-S 150. One method in which to retrieve the ICCID and MSISDN is first to select the telecom directory (i.e. FID_MF), then select the ICCID (i.e. FID_EF_ICCID) or MSISDN (i.e. FID_EF_MSISDN) record, and read a binary record indicative of the IMEI.

In one embodiment MQoS system 105 determines mobile device 110 identification. MQoS-C 102 retrieves the EF_DIR file under the MF directory. The EF_DIR file contains the list of first level applications present on a card, such as that USIM. Information on the loaded applications may be retrieved with the "GET DATA" and "GET STATUS" command.

In one aspect of the present invention, MQoS system 105 retrieves a time and date of server 160. MQoS-C 102 may retrieve time and date of a terminal by sending the USAT command "PROVIDE LOCAL INFORMATION" to MQoS-S 150.

In another aspect of the present invention, MQoS system 105 determines bandwidth. MQoS-C 102 sends packets of data to MQoS-S 150 via wireless network system 100. MQoS-S 150 monitors the packets 130 received and calculates the bandwidth. MQoS-C 102 may be configured to use the USAT proactive commands "OPEN CHANNEL", "SEND DATA", "RECEIVE DATA", and "CLOSE CHANNEL" to communicate with MQoS-S 150 as part of a process to determine bandwidth.

In still another aspect of the present invention, MQoS system 105 determines inter-packet delay. MQoS-S 150, or other terminal/network point, encodes a timestamp in each data packet and sends it to a mobile device 110 via wireless network 100. For example, MQoS-S 150, or other terminal/network point, may encode a timestamp in each data packet and send it to mobile device 110 via wireless network system 100. When the Mobile device 110 receives the packets, MQoS-C 102 extracts the timestamp and determines the inter-packet delay. Such inter-packet delay information is then stored in the Mobile device 110 and provided to MQoS-S 150. MQoS-S 150 may store the inter-packet delay information in a database for analysis and reporting.

In one aspect of the present invention, MQoS system 105 determines round-trip delay. MQoS-C 102 connects to MQoS-S 150 and requests a round trip delay. MQoS-S 150 sends a packet of data 130 to MQoS-C 102. MQoS-C 102 then receives the packet 130 and sends it back to MQoS-S 150. MQoS-S 150 determines the duration of the transaction and calculates the round trip delay. In one aspect, MQoS-C 102 uses the USAT commands "OPEN CHANNEL", "SEND DATA", "RECEIVE DATA", and "CLOSE CHANNEL" to communicate with MQoS-S 150 as part of the process to determine round-trip delay.

In one aspect of the present invention, MQoS system 105 determines one-way delay such as described above with reference to FIG. 2. MQoS-C 102 connects to MQoS-S 150, encodes a time and date in a packet of data, and then sends that packet 130 of data to MQoS-S 150. MQoS-S 150 decodes the packet 130 to retrieve the time and date and calculates the one-way delay. In one embodiment, MQoS-C 102 retrieves the current date and time by sending the USAT command "PROVIDE LOCAL INFORMATION", with timing advance as a parameter, to MQoS-S 150. In another, MQoS-C 102 uses the USAT proactive commands "OPEN CHANNEL", "SEND DATA", "RECEIVE DATA", and "CLOSE CHANNEL" to communicate with MQoS-S 150 as part of a process to determine one-way delay.

In one aspect of the present invention, MQoS system 105 determines data packet loss by analyzing several data packets 130 in a group such as described above with reference to FIG. 5. Each data packet 130 contains encoded information that specifies the group that it is in, the number of packets 130 in the group, and the sequential packet number. This information may be encoded by MQoS-S 150 application, or other network terminal point, and communicated to the mobile device 110 via the wireless network system 100. When the mobile device 110 receives such data packets 130 in a group, MQoS-C 102 extracts the relevant information and determines the packet loss. The packet loss information may then be stored in mobile device 110 and communicated to MQoS-S 150 for storage in a database, for analysis, and reporting.

In one aspect, MQoS-C 102 is configured such that the mobile subscriber may perform a self-test of the wireless network 100 and the mobile device 110 and subsequently provides the subscriber a view of such self-test information. For example, a subscriber could use this self-test feature to determine if a video feed were possible (i.e. roaming in an unknown network). In another example, a subscriber calls the customer care center with a problem; conducting a self-test would allow the customer care center agent, as well as the subscriber, to see the results.

In one aspect of the present invention, MQoS system 105 determines network transitions. When a ME detects a change in its current access technology, the ME informs the UICC that this has occurred, by using the event Access Technology Change, as will be understood by the skilled artisan. The transition from GSM to UTRAN can then be detected by the MQoS system 105. In one configuration, if a user movers from one network type to another, MQoS-C 102 may store the transition information for processing and reporting to MQoS-S 150.

In another aspect of the present invention, MQoS-C 102 monitors and measures the error rate (i.e. FER or BLER) for data communication between the mobile device 110 and the wireless network 100. These measurements are recorded in different categories based on the data class type. The location and timestamp are also recorded along with the packet loss recordings, respectively, to determine the health of the network based on time and location. MQoS data and recordings for error rate may be sent to MQoS-S 150 for storage, analysis, and reporting.

The bit error rate at the physical layer cannot be measured by the terminal at the physical layer without knowing a priori the original uncorrupted data set transmitted over the air. There are generally two techniques for reporting the received Bit Error Rate by the terminal. One is to periodically estimate the expected value of the bit error rate using air interface parameters and measurements that are available to the mobile device 110. The second approach is to use MQoS-C 102 and its corresponding server application in the network generated pre-defined data sequences.

In one aspect, MQoS-C 102 may approximate a downlink BER using interface parameters such as:

$$BER = F(Power_{TRANSMIT\ NODEB}, Power_{RECEIVED}, Data\ Rate, Channel\ Codec, TTI) \quad (1)$$

In another aspect, MQoS-C 102 determines BER using pre-defined data sequences. Using this technique, the downlink BER can be measured by MQoS-C 102 instructing a server 160 in the wireless network 100 to transmit a data sequence known to the mobile device 110 over a transparent channel (e.g. with no retransmission). MQoS-C 102 compares the received bit pattern with the known transmitted sequence to determine downlink BER. The uplink BER may be measured using the reverse of this process.

Generally, each data packet that is sent to the mobile device 110 contains an encoded checksum of the data. MQoS-S 105 encodes this checksum, before each data packet is sent. When the packet is received by the mobile device 110, MQoS-C 102 extracts this checksum and calculates a new checksum based on the data received. This new checksum is then compared with the checksum that was encoded in the data packet to determine if there is data corruption. If the data is corrupted MQoS-C 102 attempts to correct the data by using an error correction algorithm (i.e. Reed Solomon). The result of this routine is stored in mobile device 110 and communicated to MQoS-S 150. This information may be stored by MQoS-S 150 in a database for analysis and reporting.

MQoS-C 102 may monitor and measure the connection time and duration for downloading or uploading data via the wireless network 100 (i.e. video clips or MP3 files). Such measurements are recorded in different categories based on the data class type. The location and timestamp are also recorded along with the packet loss recordings, respectively, to determine the health of the network based on time and location. Such MQoS-C 102 data and recordings may be sent to MQoS-S 150 for storage, analysis, and reporting.

In another aspect of the present invention, MQoS-C 102 determines connection time. Connection time is the duration of a download or upload of data from or to the mobile device 110. MQoS-C 102 stores a total number of downloads and uploads in the mobile device 110. MQoS-C 102 may also store the connection time and size of the last download or upload. Such information may be communicated to MQoS-S 150 and stored in a database for analysis and reporting.

MQoS-S 150 and MQoS-C 102 may collaborate to determine the streaming data efficiency for the wireless network 100. Inter-packet delay, packet loss, and error rate measurements, monitored and recorded by MQoS-C 102, determine streaming efficiency. Such information may be communicated to MQoS-S 150 and stored in a database for analysis and reporting.

In one embodiment, the MQoS-C 102 application monitors and stores the efficiency of data streaming. Packets of data that represent the stream are encoded with a timestamp and expected inter-packet delay by MQoS-S 150. The MQoS-C 102 extracts such information and determines an efficiency of data streaming. Such information may be stored in the mobile device 110 and communicated to MQoS-S 150 for analysis and reporting.

MQoS-C 102 may monitor and measure a number of dropped connections from the wireless network 100. These measurements are recorded in different categories based on the data class type. The location and timestamp are also recorded along with the packet loss recordings, respectively, to determine the health of the network based on time and location.

In one aspect of the present invention, MQoS-S 150 and MQoS-C 102 work together to monitor and measure the mobile device 110 while roaming on other networks 100 such as 2G, 2.5G and 3G networks. This information may be used to determine if services are capable (e.g., available) in the current wireless network 100. For example, roaming in a 2G wireless network 100 and trying to watch a video feed. This information may be used to detect fraud, for example, where a subscriber is watching a video feed and pulls the battery off vs. dropping off the 3G network into a 2G network.

MQoS-S 150 may be configured to ascertain whether or not a phone is on a 2G, 2.5G, or 3G network. For instance, in a 2G network, all datagrams must travel through an IP Gateway. In a 3G network, the phones have IP addresses and stacks. Therefore, MQoS-S 150 can use the client IP address to determine on/off network status.

In one configuration, MQoS-C 102 is configured to record a model of the mobile device 110 (i.e. software versions, chipset, and etc.). MQoS-C 102 may communicate with the mobile device 110 to record the version of the OS. Such device recordings may be sent to MQoS-S 150 for storage, analysis, and reporting.

The MQoS-C 102 may be configured to support data compression to decrease the bandwidth needed and connection time to download or upload. MQoS-C 102 determines if the mobile device 110 can successfully compress and/or decompress data. When mobile device 110 receives compressed data, MQoS-C 102 performs decompression. Such decompressed data is processed by MQoS-C 102 or other module. In some cases, decompression is performed by the MQoS-C 102, and a test is utilized to determine decompression status. The reverse processes may be performed for data compression.

MQoS-C 102 interacts with mobile device 110 to determine the memory capacity. This information is useful to determine if the mobile device 110 has the ability to download an application or media data. Such memory recordings may be sent to MQoS-S 150 for storage, analysis, and reporting. This information is also useful for MQoS-S 150 application to determine if mobile device 110 has enough memory to complete the download.

Figure 11:
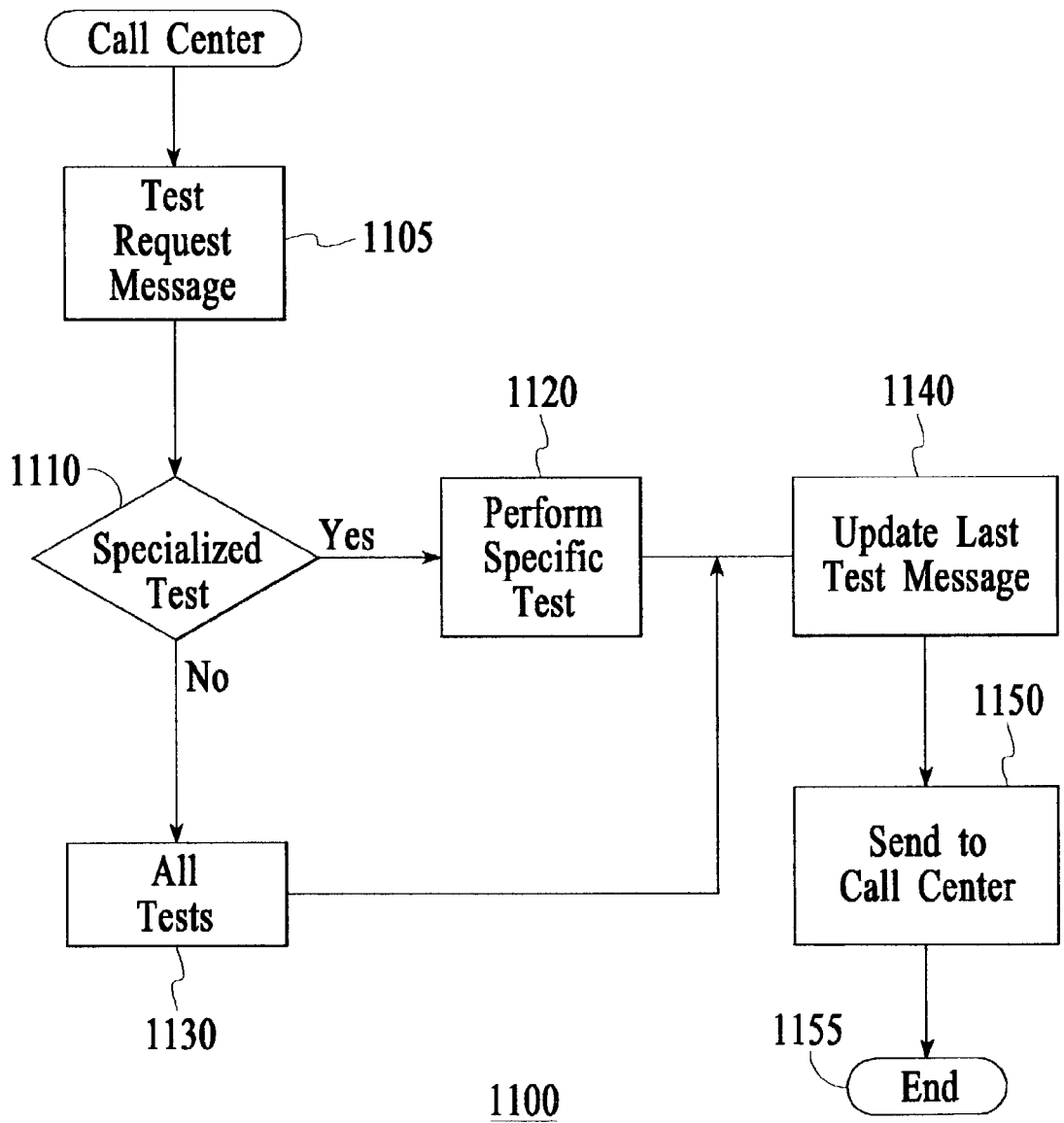
FIG. 11 is a flow chart illustrating one embodiment of a call center in accordance with aspects of the present invention.

FIG. 11 is a flow chart illustrating one embodiment of a call center test 1100 in accordance with aspects of the present invention. At 1105, a call center test request message is sent from a call center to a mobile device 110. The call center test 1100 may include a specific test request for one or more tests to be performed, a suite of tests, or an all test request packaged in the test request message. The tests requested may include one or more of the tests discussed herein, or other tests prescribed by the test request message. If at 1110 if a test is a specialized test, such test is performed at 1120 and call center test 1100 proceeds to 1140. If at 1110 all tests are requested, then at 1130 an entire set of available tests requested is performed and call center test 1100 proceeds to 1140. In one embodiment, at 1140, the test results message modifies fields of a previous test result message and sends the test result message to a call center. At 1150, after such test is performed, a message indicating test results is sent to the MQoS-S 150. Call center test 1100 ends at 1155.

Figure 12:
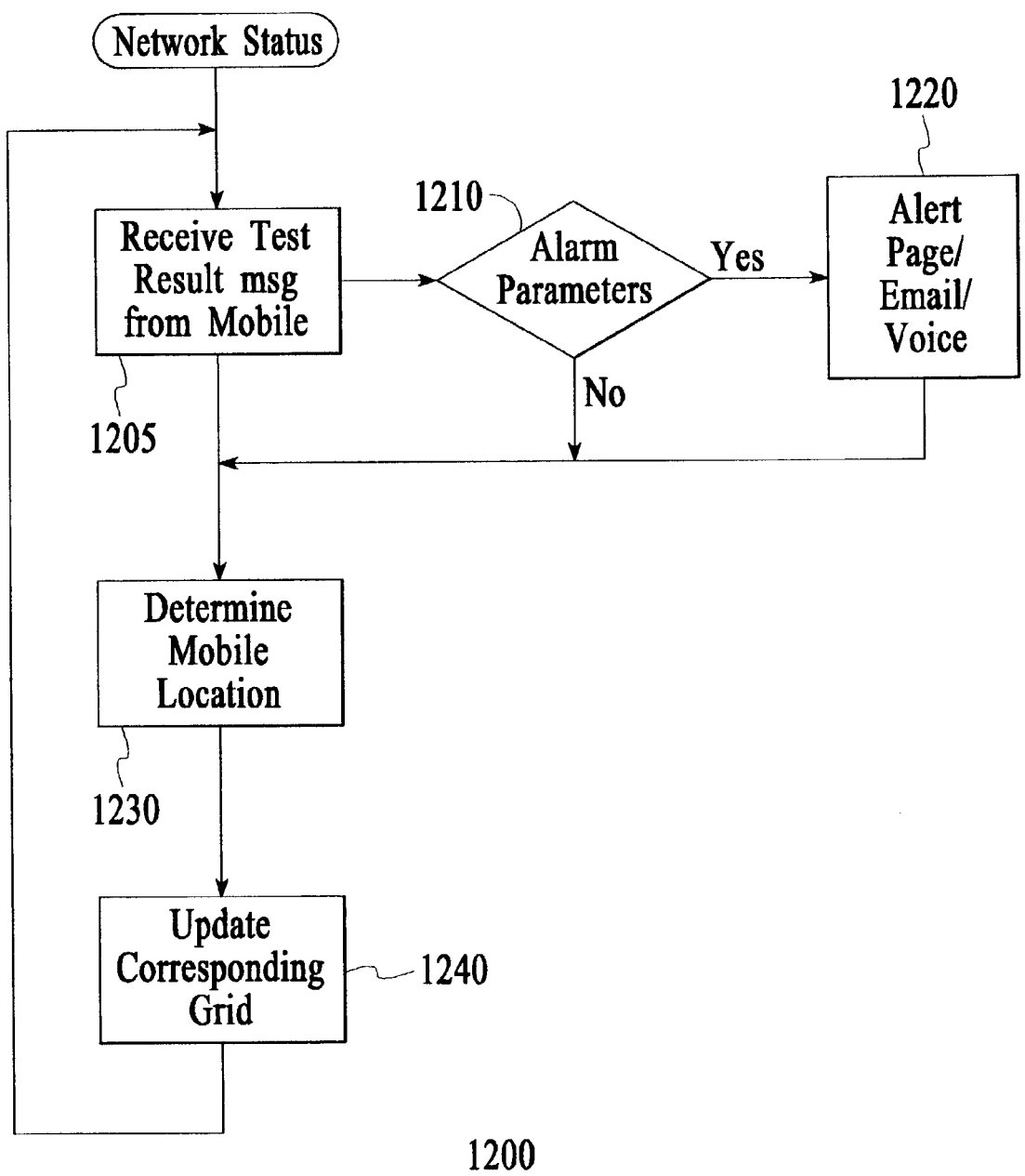
FIG. 12 is a flow chart illustrating one embodiment of a MQoS test result monitoring process in accordance with aspects of the present invention.

FIG. 12 is a flow chart illustrating one embodiment of a MQoS test result monitoring process 1200 in accordance with aspects of the present invention. MQoS-S 150 collects test result messages from one or more mobile devices 110 at 1205. MQoS-S 150 maintains a set of alarm conditions that comprises MQoS thresholds of test result messages received from MQoS-C 102. At 1210, if MQoS is below a minimum threshold specified by the alarm conditions an alert is generated at 1220. An alert may take the form of e-mail, page, computer generated voice call, and the like. An alert may be sent to an appropriate entity such as a designated technician, manager, or engineer, etc. In one embodiment, a level of a specified number of alert conditions from different mobile devices 110 are received before an alarm is sounded (e.g., to prevent a single errant mobile device 110 from too often alerting technicians that a problem needs to be addressed).

After sending the alert at 1220, or if no alert conditions are present, MQoS-S 150 determines the location of the reporting mobile device 110 at 1230. MQoS-C 102 monitors the location, time and date (timestamp) of the mobile device 110. MQoS-C 102 may use GPS or the cell based location to determine the location of the mobile device 110. The mobile device 110 location may be determined via a location algorithm (triangulation between cell base stations, GPS data forwarded from an internal receiver of the mobile device 110 to MQoS-S 150, or via a location/date/time, or other id stamp present in the test result message). A plurality of methods may be used for identifying the location of the mobile device 110, however, the date/time/location stamp is preferred. In one embodiment, location is determined by the USIM sending the USAT command "PROVIDE LOCAL INFORMATION" to MQoS-S 150. Such command retrieves the mobile country code (MCC), mobile network code (MNC), local area code (LAC), and the cell identity of the current base station within wireless network system 100.

With the location of the reporting mobile device 110, MQoS-S 150 updates a database of test message results at 1240. In one aspect, a database includes historical data corresponding to one or more of the tested items. For example, such database may include signal strength received by the mobile device 110. The database may include other historical data such as a date time stamp so that the data may be retrieved and formatted as required to show test results during different times of the day, under different weather conditions, etc.

In one embodiment at 1240, the database of test results is formatted as a grid, and each new test result data is used to update the grid. The grid includes a set of bounded areas. Each reporting mobile device 110 within a specified bounded area of the grid preferably has its statistics (test results) added to a cumulative result for that portion of the grid. If a large number of mobile devices 110 are operating in a single bounded area of the grid (e.g., more than a max necessary threshold to provide solid statistical data), a percentage of mobile devices 110 in that area may be dropped from reporting, or the reports issued from those mobiles devices 110 may be ignored. (Alternatively, all mobile reports are utilized and additional info is collected regarding the number of mobile users in each grid area.) For mobiles devices 110 reporting in a certain grid area (bounded area within the grid), statistical combinations may be utilized (e.g., averaging, median, etc) to determine specific test result values that are stored in the database and corresponding to that grid location. In the case where mobile devices 110 are reporting in certain areas, but not in others, interpolation of reported results can enable estimates for the areas not reporting. The database of test result values may be updated in real-time, providing MQoS-S 150 with a real-time picture of network performance, and a history of performance of the reporting mobile devices 110.

Figure 13:
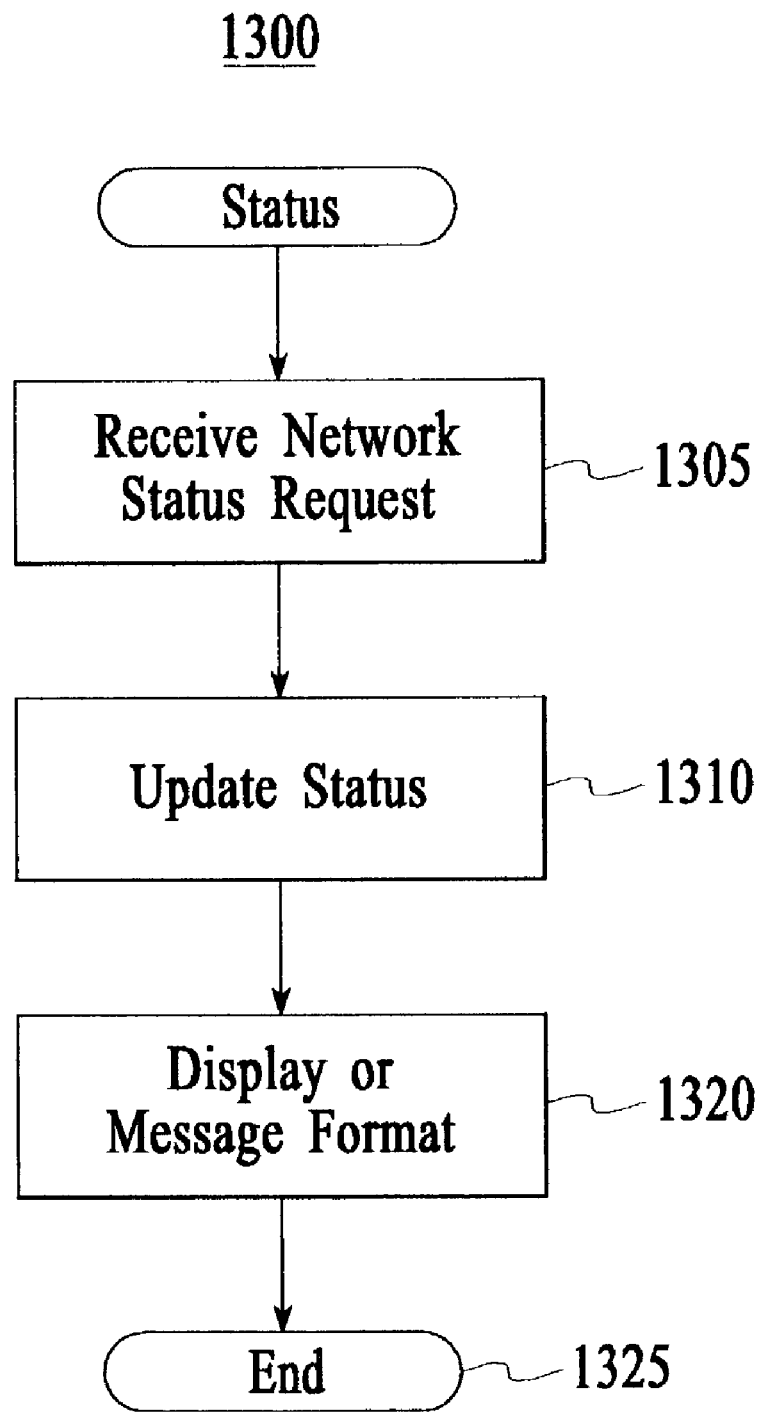
FIG. 13 is a flow chart illustrating one embodiment of a method of displaying MQoS-S test result messages in accordance with aspects of the present invention.

FIG. 13 is a flow chart illustrating one embodiment of a method 1300 of displaying MQoS-S 150 test result messages in accordance with the present invention. At step 1305, a network status message is received. The network status message is from a particular mobile device 110 that has collected network status data (e.g., signal strength, etc.) from the current location of the mobile device 110. The network status message is received by a base station (i.e., transceiver) hosting MQoS-S 150 (e.g., server 160), and the status message is forwarded to MQoS-S 150. Such network status message was sent by the mobile device 110 in response to a network status request message, a call center test request message, due to a predetermined schedule programmed into the MQoS-C 102, or by another event triggering generation and sending of the status message. Events that trigger a status message can include any number of items, including, power-up of the mobile device 110, changing cells (hand-off), or any other event identifiable by the mobile device. A predetermined schedule may include any type of schedule, e.g., periodic, random based, etc. In one aspect, a status message includes a location, time, and date stamp. Based on such a status message, the overall network status is updated at 1310. Generally, network status is updated, for example, by updating a location on a grid of network status points based on the location of the mobile device 110 submitting the received status. The grid location is updated by writing over the previous network status stored at the grid location, or by statistically averaging (or other function) the newly received status with the existing status at the grid location.

The network status is then displayed at 1320 to a technician or other user of MQoS-S 150. Rather than local display, the updated network status may be packaged into a message and sent to a remote location for further processing or remote display. An email containing specific network status items, or a summary of network status is sent to technicians and any appropriate managers. The grid location may be updated at 1320. Display of the network status can be displayed in a plurality of ways. For example, a map of color-coded status. The map may be superimposed over geographic features of the area of network coverage. A 3-D map (e.g., higher points indicating greater MQoS) may also be superimposed over another map (geographic features, street map, etc.).

Figure 14A:
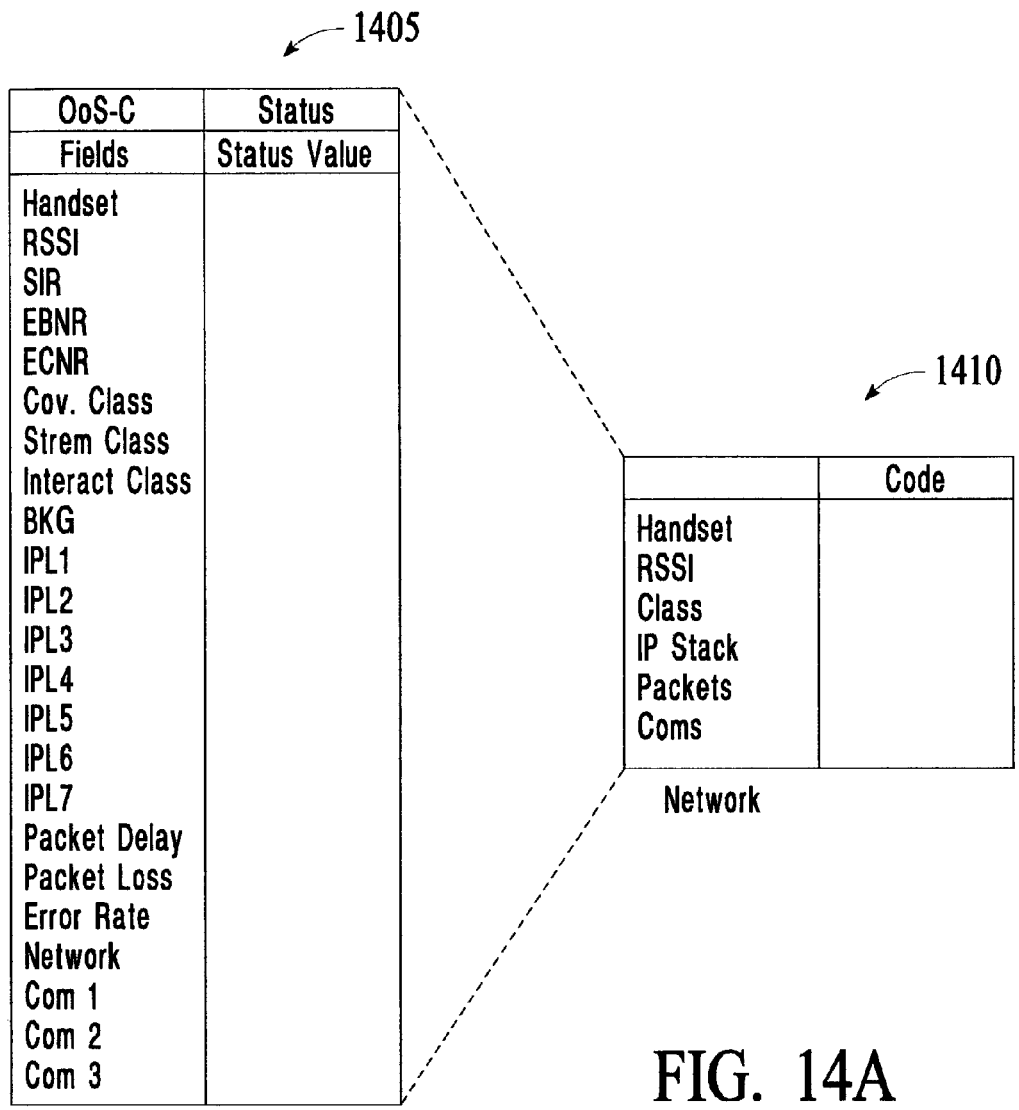
FIG. 14A illustrates one embodiment of an example MQOS status record in accordance with aspects of the present invention.
Figure 14B:
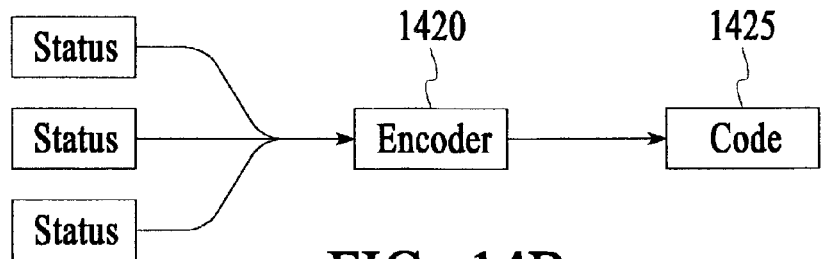
FIG. 14B illustrates one embodiment of example MQOS encoded messages and encoding process in accordance with aspects of the present invention.

In one embodiment, the amount of data sent from the MQoS-C 102 is encoded to reduce traffic. FIG. 14A illustrates an example MQoS-C 102 status record 1405 and an example MQoS-C 102 status message 1410 according to an embodiment of the present invention. The MQoS-C 102 status record includes fields that indicate a specific test performed by MQoS-C 102 and corresponding status values that indicate the results of the individual tests. The fields and status shown illustrate only a small portion of the available testing, which is also dependent on the specific platform (some mobile devices 110 have greater access to test routines to perform additional tests). Therefore, a significant amount of status values may be tested. As shown in FIG. 14B, sets of status values are encoded by an encoder 1420 to produce a smaller more compact code 1425 that can be unencoded at a processing point such as server 160, and the like, to retrieve the individual status values. In the example of 1405/1410, Cov. Class, Strem Class, Interact Class, and BKG are encoded into a single status field Class in 1410. Similarly, IPL1 . . . IPL7 are encoded into IP Stack, and Packet Delay, Packet Loss, Error Rate, and Network, are encoded into packets 130. The above is merely exemplary, and any combination of tests may be combined or individually encoded to produce a code for transport to MQoS-S 150.

Data Communication

The following focuses on aspects of MQoS measuring and monitoring of data communication between the mobile device 110 and the wireless network 100 in accordance with aspects of the present invention.

IP Stack

Generally, terminals such as a 3G terminal have some form of an IP Stack or Internet Protocol Stack that sits on top of the RF element as is known. The IP Stack consists of seven layers of protocols and/or signaling specifications.

The OSI layers are as follows:

7 Application
6 Presentation
5 Session
4 Transport
3 Network
2 Data Link
1 Physical Link Conventionally, communication devices implement a protocol stack having similar layer. Generally, the implemented stack has one or more layers combined or named differently. In one aspect, MQoS-C 102 may include processes that monitor the status of each OSI or other layer, retries for specific protocols such as TCP, dropped packets in protocols such as UDP, and inter-packet delay among other protocol attributes. For example, MQoS-C 102 may be used to monitor transport traffic on the transport layer (i.e., layer 4) thereby monitoring data moving in and out of a mobile device 110. MQoS-C 102 may be used to determine the types of data streams that are being sent to higher-level applications. For example, MQoS-C 102 may be used to detect data streams for an application that uses Real-time Transmission Protocol (RTP) used to transfer data in real-time.

IP Protocols

In one aspect of the present invention, at an application layer (i.e., layer 7) of the IP stack, MQoS-C 102 may be used to monitor a plurality of IP protocols such TCP, FTP, RTP, RDP, UDP, HTTP, UDP/Multicast and the like. Each type of protocol has a specific service grade that might be associated with it. For instance, RTP was designed for real-time transfer of information. The applications may be digital voice, video, video phone, stock tickers and other information that has timing requirements. HTTP, UDP, etc. are monitored for efficiency, packet loss and other metrics. MQoS-C 102 may be used to monitor additional parameters such as IP Stack, IP Protocols, and related data including, but not limited to, the following:

Stack Monitoring

Stack monitoring is a statistical analysis method that monitors the health of the IP stack. The statistical analysis is generated from processing time performed at each layer in the protocol stack. In one embodiment, the processing time is the time required to process the packet headers at each layer. Alternatively, the processing time is the processing of the header and forwarding the full packet to the next layer.

A baseline or predetermined statistics may be determined for processing time at each protocol layer. For example, consider a 3-layer protocol stack having a network layer, transport layer, and application layer. Through evaluation of test packets or actual use in combination with a testing device, an amount of time that is needed for processing an average packet by each of the protocol stack layers can be determined. The average times can be expressed in percentages, for example, 30% of the time for each packet is spent at the network layer, 20% at the transport layer, and 50% at the application layer.

During actual operation of mobile device 110, or other device, e.g. wireless device, the network stack is monitored to determine how long each packet 130 remains in processing at each layer. The actual use statistics of processing time thus gathered are then compared to baseline percentages. If one of the network layers is spending more than a predetermined margin of error over the baseline statistic for that layer, an alert or other data indicating that condition is packaged into a message and sent to MQoS-S 150.

In one embodiment, the timing of processing time during actual use may be implemented using a time stamp that indicates when processing at the layer being tested starts. The time stamp may be compared to an end time of processing for that packet at the layer being tested. The time stamp may be implemented by recognizing specific programming steps in the particular protocol layers. For example, at the network layer, a specific programming step may be set a specific status register that indicates taking control of a bus line. Virtually any programming step that is unique, or accesses a unique memory location may be keyed into invoking a time stamp measurement for either a starting time of processing or an end time of processing for the specific protocol layer in which that programming step is unique.

Since maintaining statistical data for each protocol layer of every packet 130 may impose a burden for a mobile device 110 having limited processing capabilities, the present invention may be configured to implement one or more schemes to reduce the amount of statistics collected. For example, a ratio of tested/untested packets is implemented. In one embodiment, only one of ten packets 130 is tested. In another embodiment, groups of one hundred packets 130 are tested together (e.g., determining an amount of time a layer requires to process 100 packets).

Another embodiment provides that each packet 130 (or a portion of packets 130) is tested, but only at one specific protocol layer at a time. For example, 20% of the first one hundred packets 130 are time stamped and have statistics collected, but only at the network layer. Then, 20% of the next one hundred packets 130 are time stamped and statistics collected, but only at the transport layer, and so forth. The statistics may be used to determine an average actual time for processing for each layer, which is then compared to the baseline statistics.

The ratio of packets 130 may also be adjusted based on a number of factors. Amount of time spent at each layer might warrant a higher or lower percentage of packets tested. In the above example, to increase statistics gathering speed the percentage of packets tested my be increased, particularly if the mobile device 110 has unused computing capacity as it waits for a hardware stack to perform. Depending on the actual mobile device 110 implementation, if a software stack needs more processing time to perform its required tasks, the ratio of packets tested may be lowered.

The MQoS system 105 of the present invention may be flexibly configured to match what is needed for a particular handset/mobile network implementation. In one aspect, the various parameters that are set up for a particular handset/mobile network implementation may be changed in real time to reflect various operating circumstances or specific test situations that may need to be tested. A user interface allows a network technician to implement the various ratios for reporting by specifying a ration for each protocol layer. The specific parameters can also be changed on a group of mobile devices 110 (e.g., all 415 phones gather statistics one way, and 650 phones gather statistics differently, etc.). Information needed to set up phones is sent to the phone in a message and set up by MQoS-C 102.

In one embodiment, MQoS-C 102 monitors specific application quality by monitoring the application layer. For example, consider the case where a content provider and network provider want to stream video of a soccer event to a mobile device 110. The content provider would provide the "content" i.e. the live event and the network provider would broadcast the content. MQoS-C 102 monitors MQoS by evaluating MQoS metrics described above such as packet loss, time delay and other MQoS metrics. Thus, MQoS-C 102 may be used to monitor the level of quality at the application layer to provide the network provider a means to show proof of quality and delivery of services.

In other words, the MQoS system 105 may provide a statistical average of processing times at the various protocol layers. For example, if a protocol layer is determined to be performing at less than the baseline statistic for that layer, a message may be prepared and sent to MQoS-S 150. Such message may include data identifying the low performing protocol layer. Such data may be stored in a database and used to generate alerts to technicians, and included in reports to supervisors and management. In another embodiment, MQoS-C 102 data on processing times, etc., are provided to MQoS-S 150 where such data may be analyzed, stored, and reports generated. In yet another embodiment, MQoS-C 102 receives and minimally processes raw data collected at the various levels (e.g., determine a total amount of processing time for each level). Results of such minimal processing are provided to MQoS-S 150 for a more refined processing. Such refined processing may be used to determine percentages, etc.

Generally, virtually all processing performed at the mobile device 110 may be configured so as to increase efficiency of the data collection and communication process in a way that relieves burden on the mobile device 110. For example, if a relatively small amount of additional processing at the mobile device 110 provides an amount of processing or data transmission performed on the mobile device 110 to transmit the statistics to MQoS-S 150 such that the overall workload on the mobile device 110 is reduced, then at least some data processing is performed at the mobile device 110. In one embodiment, MQoS-C 102 performs a similar data reduction on other data such as statistics, faults, or other conditions (e.g., round trip times, connection times, streaming efficiencies, or any other data) monitored within the mobile device 110 or its communications channels. The processes described above may be applied to any number of protocols or systems having different layers or levels of communication processing. In addition, the processes may be applied to specific blocks of functionality within a mobile device 110 whether or not they related to transport or communication packets.

Network

This section focuses on the MQoS monitoring and measurements of the wireless network 100. For example, MQoS system 105 may record some information as described herein to determine the overall health, performance, network transitions, fraudulent use, and the like, of the wireless network system 100.

Loop Back

The MQoS-C 102 or MQoS-S 150 may be configured to use various protocols such as ICMP to perform loop back testing. Although this is one means to perform such a task, other protocols and means are contemplated. It is important to measure the loop back for round trip delay, packet loss, data corruption, inter-packet delay, and a plurality of other variables as described above.

Applications and Application Protocols

MQoS Data Classes

A plurality of MQoS data classes are monitored and measured by MQoS-C 102. Data classes, for example the conversational class vs. the streaming class, may have different expected levels of MQoS that provide acceptable experiences for a subscriber. A subscriber may be having a conversation with high error rate and not notice any difference in MQoS, while another subscriber with the same error rate while watching a video clip may experience a difference in MQoS. MQoS-C 102 may monitor these different data classes as described further in this section and may store the results for each class, basically describing the overall experience of the subscriber to the MNO. Some examples of data classes monitored by MQoS-C 102 and MQoS-S 150 are conversation class, Streaming Class, Interactive Class, Background Class, and the like.

The most well known use of the conversation class is telephony speech (e.g. GSM). With Internet and multimedia a number of new applications will require a MQoS scheme to monitor performance, for example voice over IP and video conferencing tools. Real time conversation is generally performed between peers (or groups) of live (human) end-users.

In one embodiment, MQoS-C 102 characterizes a real time conversation scheme such that the transfer time shall be low because of the conversational nature of the scheme and at the same time that the time relation (variation) between information entities of the stream shall be preserved in the same way as for real time streams. The maximum transfer delay is given by the human perception of video and audio conversation. Thus, the limit for acceptable transfer delay is strict, as failure to provide low enough transfer delay will result in unacceptable lack of MQoS. The transfer delay requirement is therefore both significantly lower and more stringent than the round trip delay of the interactive traffic case.

In summary, the present invention includes the collection and analysis of data or other factors describing the subscriber's experience to determine the quality of wireless service in a network system 100 such as a 3G GSM network. In one embodiment, MQoS-C 102 is embedded within the Mobile device 110 or SIM/USIM (device) and interacts with the mobile end radio applications, OS, communication protocol layers, and other parts of the mobile device 110 to monitor and measure different MQoS aspects of the subscriber's experience (including, for example, data packets communicated through the mobile and produce data needed for compiling the MQoS metrics). This monitoring and measurement process (a decipher process) detects packet communication faults and other communication related data and communicates it to MQoS-S 150 that may be stored in a database such as a SQL database and may be used to communicate a subscriber's experience to technicians, management, etc. Faults and other MQoS related data may be temporarily held in memory at the mobile device 110 prior to communication to MQoS-S 150. Upon receipt of the data, MQoS-S 150 may perform fault identification routines including one or more of specific fault identifications based on hard data or statistical analysis pointing to specific problems in the mobile device 110 or communications channels. In one aspect, MQoS-S 150 aggregates the data and provides alerts to technicians and reports to supervisors and management. Thus, the MQoS system 105 may be used to provide data from the mobile device 110 to the network system 100 to enhance MQoS. MQoS system 105 may also be configured for other embodiments to enhance the mobile user's experience and help improve customer care. For example, in one aspect, MQoS-C 102 may include a virus protection program that works independently or in collaboration with network system 100 to protect a mobile user's data and programs from software viruses before MQoS is compromised by a software virus.

Although the present invention has been described herein with reference to mobile device 110, particularly GSM or other cell phone type mobile devices 110, the devices and processes of the present invention may be otherwise applied to any mobile or even wireline based devices. For example, the present invention is particularly well suited for UMTS and UMTS type services, and is especially well suited for operation in J2ME mobile device 110 having appropriate supporting features (e.g., access to test ports). The invention is especially useful in 2.5G and 3G mobile device/infrastructure, IP core, multimedia broadcasting and professional management of successful implementations, but other technologies can also benefit from the same processes.

While the foregoing is directed to embodiments of the present invention, other and further embodiments of the present invention may be devised without departing from the basic scope thereof, and the scope thereof is determined by the claims that follow.

The invention claimed is:

1. A method of monitoring quality of service associated with a packet-based wireless network, the wireless network including at least one wireless device and a fixed transceiver wherein the wireless device comprises a mobile handset having an internal processor, an internal memory and a user input for input of data by a user of the wireless device, the method comprising:
    embedding a program in the processor for processing quality of service data in the handset,
    monitoring, by the wireless device, communication data packets associated with a communication link established between the wireless device and the wireless network;
    determining at least one quality of service metric to measure with respect to a user of the wireless device;
    receiving quality of service data from the communication data packets relevant to determine a quality of service;
    storing quality of service data in the memory of the handset;
    processing the quality of service data in the handset in a manner relevant to determining the quality of service using the embedded quality of service program in the processor; and,
    wirelessly providing the processed data to the fixed transceiver wherein at least one quality of service data is input by the user using the wireless device.

2. The method of claim 1, further comprising transmitting at least some of the data packets from the fixed transceiver including at least some of the quality of service data to the wireless device relating to the status of the wireless network.

3. The method of claim 2, wherein the wireless device transmits at least some instructions to the fixed transceiver according to protocols in the program of the wireless device used to request the transmission of at least some of the quality of service data therefrom.

4. The method of claim 2, wherein at least some of the protocols are selected from protocols defined within 3G and 2.5G network standards for a packet-based wireless network environment.

5. The method of claim 2, wherein the at least some protocols are transmitted over a control channel.

6. The method of claim 1, wherein quality of service data comprises information indicative of location of the mobile handset and at least one mobile quality of service metric.

7. The method of claim 6, wherein the at least one quality of service metric is selected from one of identification, configuration, time of terminal, date of terminal, timestamp, bandwidth, inter-packet delay, round trip delay, one way delay, packet loss, customer service agent test, user self test, connection type, bit error rate, block error rate, frame error rate, packet retransmission, battery strength, signal to interference ratio, received signal strength indicator, energy per bit to noise ratio, energy per chip noise ratio, dropped connections, connection time, terminal memory usage, terminal diagnostics, network transitions, MTU analysis, ATU analysis, and combinations thereof.

8. The method of claim 1, wherein the processed data represents at least some of the quality of service of the wireless network on which the wireless device operates with respect to a user's experience thereof.

9. The method of claim 8, wherein the quality of service is determined from at least some of the processed data provided by the wireless network and the wireless device.

10. The method of claim 8, wherein the at least one quality of service metric is determined from at least some of the processed data provided by the wireless network and the wireless device.

11. The method of claim 1, wherein the mobile handset has a display and at least one quality of service data is displayed on the handset display to the user using the wireless device.

12. The method of claim 1, further comprising querying the user to input quality of service data.

13. A wireless device configured for use in a packet-based wireless network, wherein the wireless device comprises a mobile handset having a SIM/USIM and a user input for input of data by a user of the wireless device, comprising:
    an embedded program in the SIM/USIM that enables processing of quality of service data;
    a transceiver configured to communicate with the wireless network, wherein the wireless network includes a communication channel for moving data packets between the wireless device and the wireless network; and,
    a processor in the handset configured to process quality of service data in the wireless device with the embedded program in the SIM/USJM in a manner relevant to determining a quality of service, wherein the processor is programmed to include a test routine to monitor and measure the functionality of the mobile device to operate in a packet-based wireless network environment and is programmed to include at least one test routine to evaluate and report packet performance parameters when operating in the wireless network environment and wherein the transceiver is configured to receive at least some quality of service data from a user of the wireless device through the user input of the mobile handset and transmit the data to the wireless network.

14. The wireless device of claim 13, further comprising a messaging device in the handset, wherein the messaging device comprises a transmitter configured to transmit the processed data to a wireless network.

15. The wireless device of claim 13, wherein the transceiver comprises a receiver configured to receive at least some quality of service data from a wireless network that relates to the status of the wireless network.

16. The wireless device of claim 13, wherein the mobile handset has a display and at least some quality of service data is displayed on the handset display to a user of the wireless device.

17. The wireless device of claim 13, wherein the transceiver comprises a transmitter configured to transmit processed data to the network.

18. The wireless device of claim 13, wherein the transceiver comprises a transmitter configured to transmit instructions from the processor to the network.

19. The wireless device of claim 13, further comprising a memory in the handset containing instructions that when implemented on the processor cause the processor to process the quality of service program embedded in the processor and process the quality of service data and report the results of the quality of service data processing to the network.

20. The wireless device of claim 13, wherein the communication channel is a packet channel.

21. The wireless device of claim 13, wherein the evaluation of the packet performance parameters includes a monitoring and a measurement process to detect packet communication faults.

22. The wireless device of claim 13, wherein the packet performance parameters include network bandwidth for packet transfers.

23. The wireless device of claim 22, wherein the network includes a quality of service server and the wireless device is a quality of service client, wherein the wireless device as a client sends packets to the quality of service server via the wireless network and the quality of service server monitors the packets received and calculates the bandwidth.

24. The wireless device of claim 23, wherein the quality of service server reports the calculated bandwidth to the client.

25. The wireless device of claim 24, wherein the wireless device sends packets to the quality of service server via a mutual control channel for the quality of service client and the quality of service server.

26. The wireless device of claim 13, wherein the packet performance parameters include inter-packet delay.

27. The wireless device of claim 26, wherein the wireless network includes a quality of service server and the wireless device is a client o the quality of service server, wherein the quality of service server measures and processes elapsed time between data packets transmitted over the wireless network to the wireless device as a client and the wireless device measures and records inter-packet delay.

28. The wireless device of claim 13, wherein the packet performance parameters include one way delay.

29. The wireless device of claim 28, wherein the network includes a quality of service server and the wireless device is a client of the quality of service server, wherein one of the wireless device as a client and the quality of service server timestamps one or more packets and transmits the timestamped packets to the other of the wireless device as a client and the quality of service server.

30. The wireless device of claim 13, wherein the packet performance parameters include round trip delay.

31. The wireless device of claim 30, wherein the network includes a quality of service server and the wireless device is a client of the quality of service server, wherein one of the wireless device as a client and the quality of service server timestamps one or more packets and transmits the timestamped packets to the other of the wireless device as a client and the quality of service server and wherein the one receiving the timestamped packets returns the timestamped packets to the other.

32. The wireless device of claim 13, wherein the packet performance parameters include packet loss.

33. The wireless device of claim 32, wherein the network includes a quality of service server and the wireless device is a client of the quality of service server, wherein one of the wireless device as a client and the quality of service server measures and records packet loss and the recorded measurement of packet loss is used by either of the wireless device as a client and the quality of service server.

34. The wireless device of claim 13, wherein the packet performance parameters include packet corruption.

35. The wireless device of claim 34, wherein the network includes a quality of service server and the wireless device is a client of the quality of service server, wherein one of the wireless device as a client and the quality of service server measures and records packet corruption and the recorded measurement of packet corruption is used by either of the wireless device as a client and the quality of service server.

36. The wireless device of claim 34, wherein one of the wireless device as a client and the quality of service server measures and records packet loss and the recorded measurement of packet loss and packet corruption are used by either of the wireless device as a client and the quality of service server to initiate packet retransmission of lost and corrupted packets.

37. The wireless device of claim 13, wherein the packet performance parameters include packet transmission bandwidth.

38. The wireless device of claim 37, wherein the network includes a quality of service server and the wireless device is a client of the quality of service server, wherein one of the wireless device as a client and the quality of service server measures and records packet transmission bandwidth and the recorded measurement of packet transmission on bandwidth is used by either of the wireless device as a client and the quality of service server.

* * * * *